(12) United States Patent
Meagher

(10) Patent No.: US 8,822,848 B2
(45) Date of Patent: Sep. 2, 2014

(54) BIOPTICAL POINT OF SALE (POS) CHECKOUT SYSTEM EMPLOYING A RETRACTABLE WEIGH PLATTER SUPPORT SUBSYSTEM

(75) Inventor: Mark Meagher, Woodbury, NJ (US)

(73) Assignee: Metrologic Instruments, Inc., Blackwood, NJ (US)

(*) Notice: Subject to any disclaimer, the term of this patent is extended or adjusted under 35 U.S.C. 154(b) by 288 days.

(21) Appl. No.: 13/224,713

(22) Filed: Sep. 2, 2011

(65) Prior Publication Data
US 2013/0056285 A1 Mar. 7, 2013

(51) Int. Cl.
G01G 19/414 (2006.01)
G01G 23/02 (2006.01)
G01G 23/06 (2006.01)

(52) U.S. Cl.
CPC ........... *G01G 19/4144* (2013.01); *G01G 23/02* (2013.01)
USPC ....................................... 177/25.15; 177/154

(58) Field of Classification Search
USPC ................ 177/25.15, 154–159, 184–189
See application file for complete search history.

(56) References Cited

U.S. PATENT DOCUMENTS

| | | | |
|---|---|---|---|
| 1,379,215 A | 5/1921 | Riedel | |
| 3,211,245 A * | 10/1965 | Loshbough | 177/3 |
| 3,613,808 A * | 10/1971 | Bunnelle | 177/53 |
| 3,984,667 A * | 10/1976 | Loshbough | 705/415 |
| 4,084,698 A * | 4/1978 | Niederer | 209/649 |
| 4,656,344 A | 4/1987 | Mergenthaler et al. | |
| 4,660,663 A | 4/1987 | Amacher et al. | |
| 4,715,457 A * | 12/1987 | Amacher et al. | 177/1 |
| 4,836,312 A * | 6/1989 | Hubbard | 177/210 FP |
| 4,903,788 A * | 2/1990 | Cordery et al. | 177/210 FP |
| 4,932,486 A * | 6/1990 | Komoto et al. | 177/50 |
| 4,960,985 A | 10/1990 | Knowles | |
| 5,058,691 A * | 10/1991 | Sela | 177/50 |
| 5,109,937 A * | 5/1992 | Kipp | 177/145 |
| 5,143,164 A * | 9/1992 | Nahar | 177/50 |
| 5,174,399 A * | 12/1992 | Brauneis | 177/25.15 |
| 5,266,749 A * | 11/1993 | Dolan et al. | 177/154 |
| 5,747,744 A | 5/1998 | Kraft et al. | |
| 5,832,417 A | 11/1998 | Petrucelli et al. | |
| 5,834,708 A * | 11/1998 | Svetal et al. | 177/180 |
| 5,987,428 A | 11/1999 | Walter | |
| 5,999,663 A | 12/1999 | Edwards et al. | |
| 6,080,938 A | 6/2000 | Lutz | |
| 6,085,979 A * | 7/2000 | Maddox | 235/462.13 |
| 6,145,629 A | 11/2000 | Addy | |
| 6,155,486 A | 12/2000 | Lutz | |
| 6,155,489 A | 12/2000 | Collins, Jr. et al. | |

(Continued)

*Primary Examiner* — Randy W Gibson
(74) *Attorney, Agent, or Firm* — Additon, Higgins & Pendleton, P.A.

(57) ABSTRACT

A POS-based checkout/scale system including system housing having a vertical housing section with a vertical scanning window, and a horizontal housing section. An electronic weigh scale subsystem is integrated with the system housing, and has a weigh platter supported above the horizontal housing section by a pair of cantilever-type weigh scale arms operably connected to an electronic load cell module. During a first mode of operation a powered support mechanism allows the cantilever-type weigh scale arms to bear the full weight of the weigh platter and any items supported thereon so that the electronic load cell module can accurately measure the weight of items on the weigh platter, and generate weigh data for transmission to the host computer system. During a second mode of operation, the powered support mechanism automatically prevents the electronic load cell module from experiencing the weight of items placed on the weigh platter.

20 Claims, 24 Drawing Sheets

(56) References Cited

U.S. PATENT DOCUMENTS

| | | |
|---|---|---|
| 6,215,078 B1 | 4/2001 | Torres et al. |
| 6,296,184 B1 | 10/2001 | Dejaeger |
| 6,332,575 B1 | 12/2001 | Schuessler et al. |
| 6,363,366 B1 | 3/2002 | Henty |
| 6,547,040 B2 | 4/2003 | Goodwin, III |
| 6,600,112 B2 * | 7/2003 | Iseli .................. 177/154 |
| 6,779,722 B1 | 8/2004 | Mason |
| 6,794,586 B1 | 9/2004 | Mason |
| 6,797,893 B2 * | 9/2004 | Eaton et al. ............ 177/154 |
| 6,854,647 B2 | 2/2005 | Collins, Jr. et al. |
| 7,044,370 B2 | 5/2006 | Bellis, Jr. et al. |
| 7,066,389 B2 | 6/2006 | Dickover et al. |
| 7,070,097 B2 | 7/2006 | Blanford et al. |
| 7,247,802 B1 | 7/2007 | Minter |
| 7,370,730 B2 | 5/2008 | Johnson et al. |
| 7,454,365 B1 | 11/2008 | Brosnan et al. |
| 7,533,799 B2 | 5/2009 | Edwards |
| 7,575,162 B1 | 8/2009 | Malchak et al. |
| 7,587,335 B2 | 9/2009 | Schuller et al. |
| RE41,093 E | 2/2010 | Lutz et al. |
| 7,780,081 B1 | 8/2010 | Liang |
| 8,033,461 B2 | 10/2011 | Barron et al. |
| 8,136,727 B2 | 3/2012 | Rollyson et al. |
| 8,196,822 B2 | 6/2012 | Goncalves |
| 8,525,051 B2 * | 9/2013 | Hauck et al. .............. 177/124 |
| 2006/0131416 A1 | 6/2006 | Jwo |
| 2007/0210165 A1 | 9/2007 | Knowles et al. |
| 2007/0228172 A1 * | 10/2007 | Knowles et al. ........ 235/462.13 |
| 2007/0290043 A1 | 12/2007 | Russell et al. |
| 2011/0147099 A1 * | 6/2011 | Burkhard et al. ........... 177/246 |

* cited by examiner

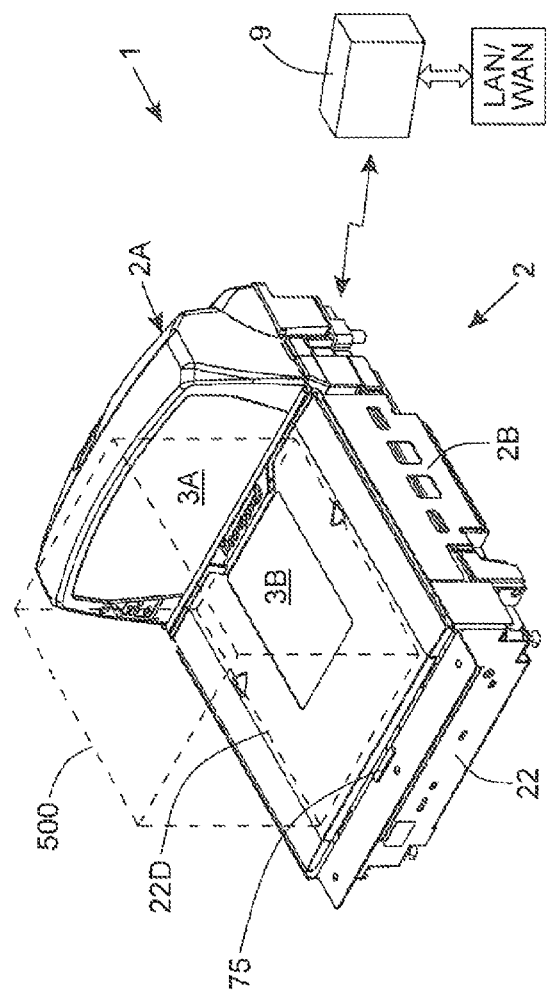
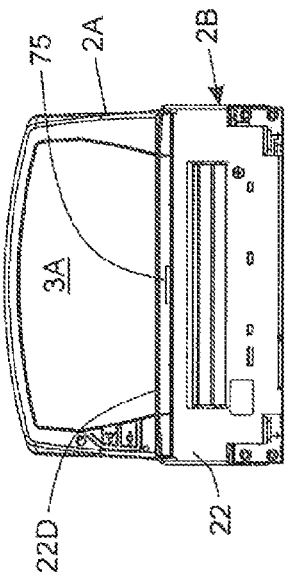
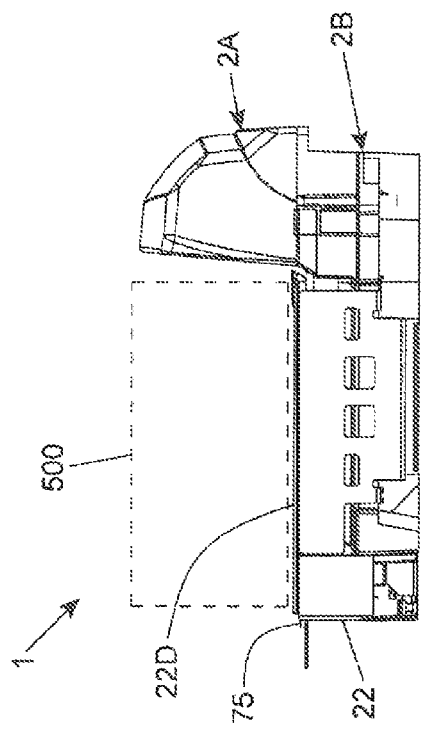
FIG. 1A
FIG. 1C
FIG. 1B

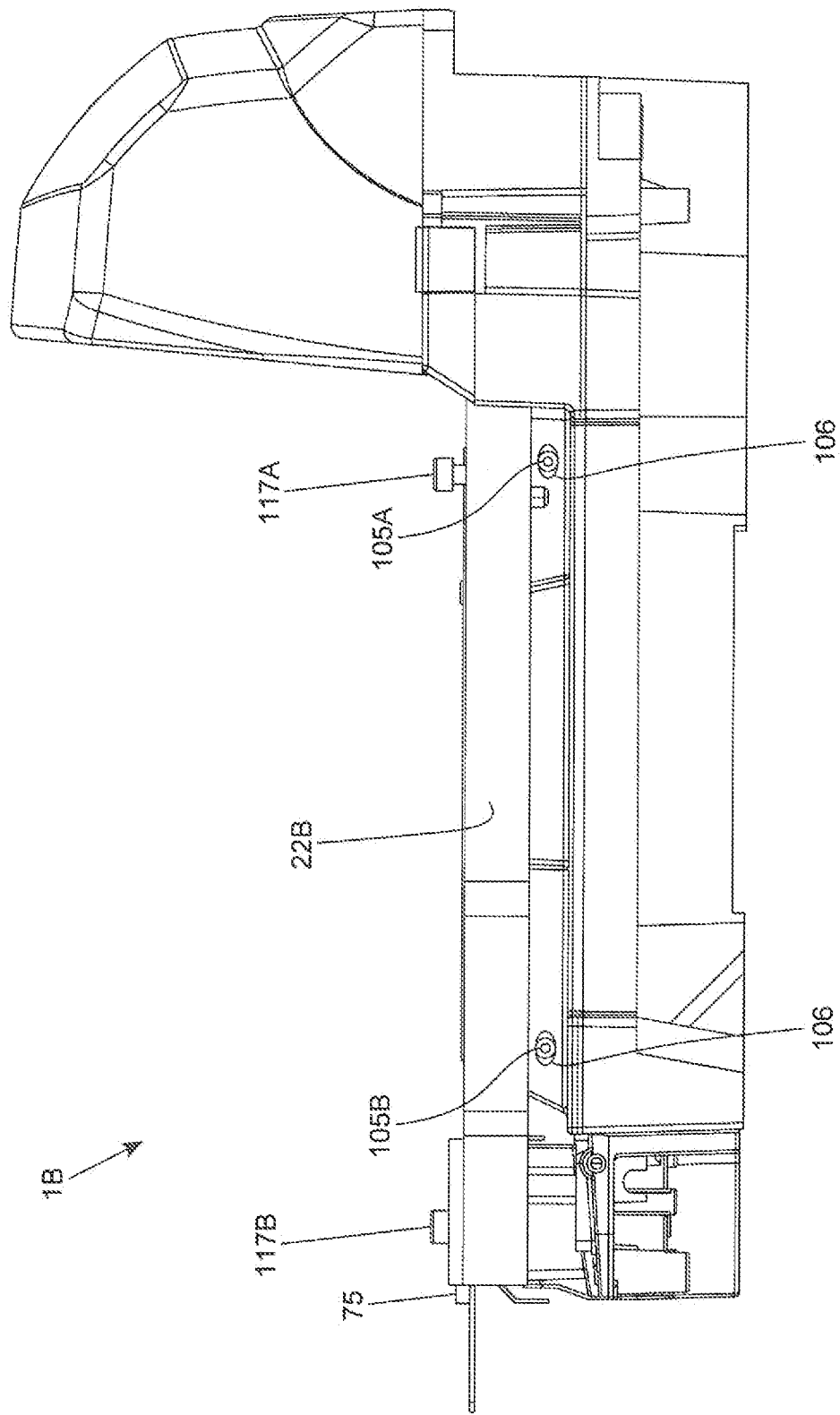

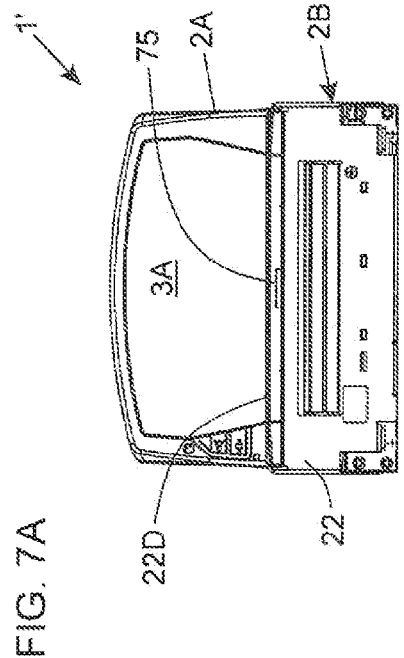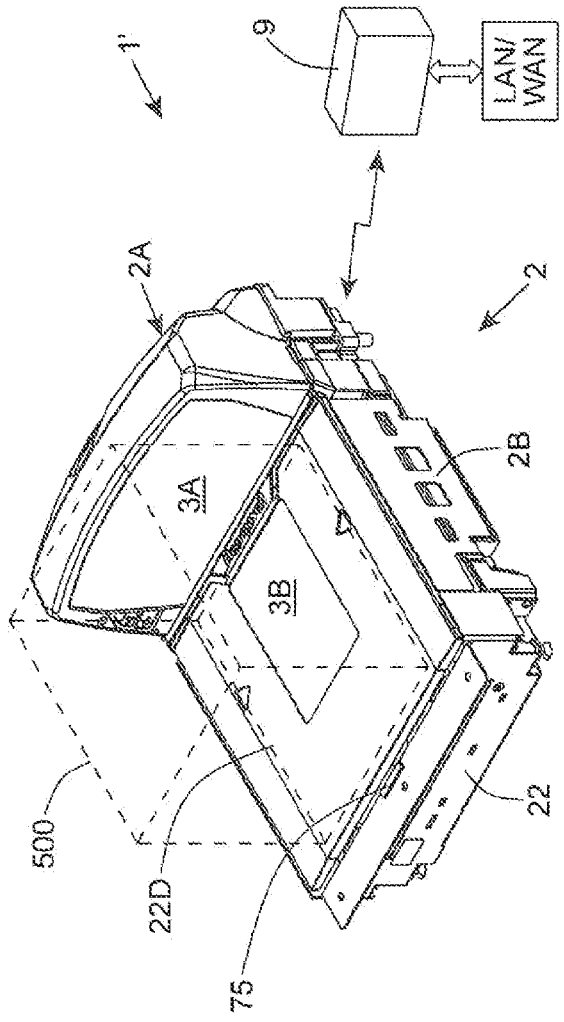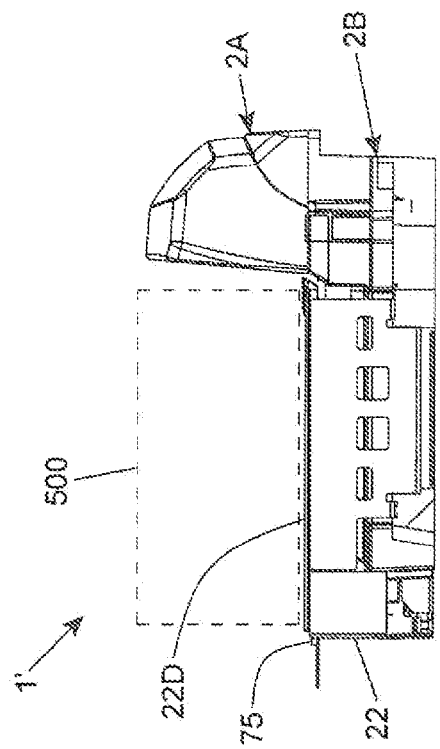

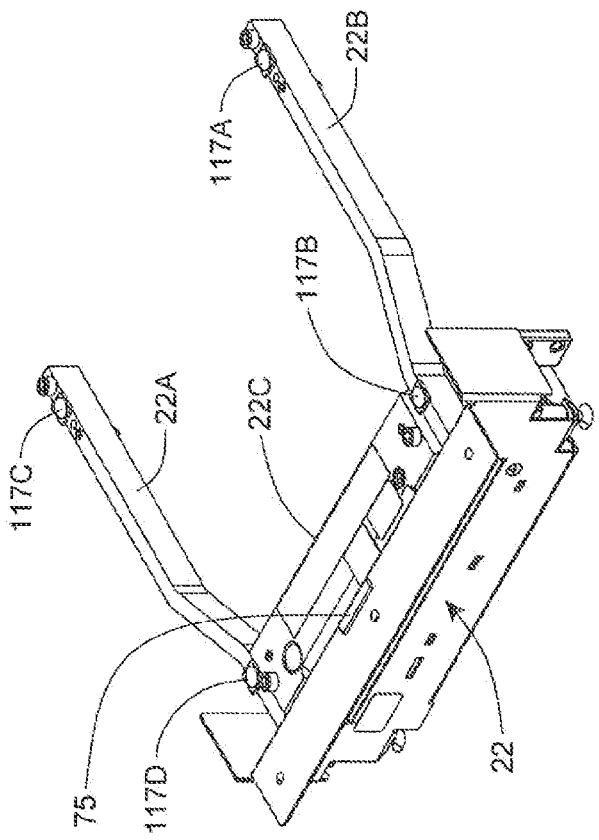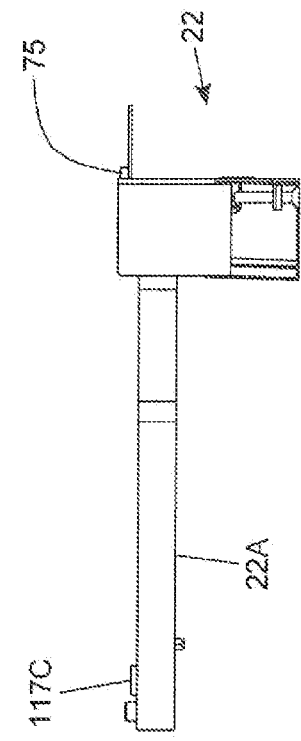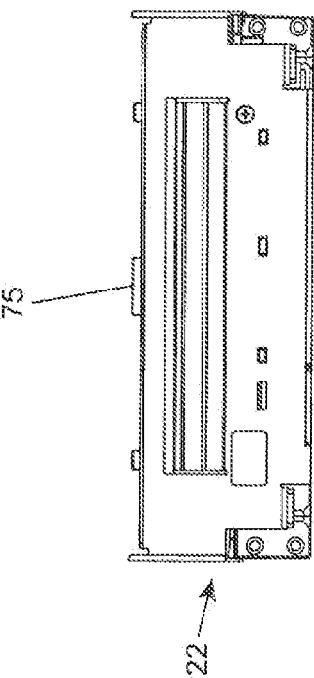
FIG. 8A
FIG. 8C
FIG. 8B

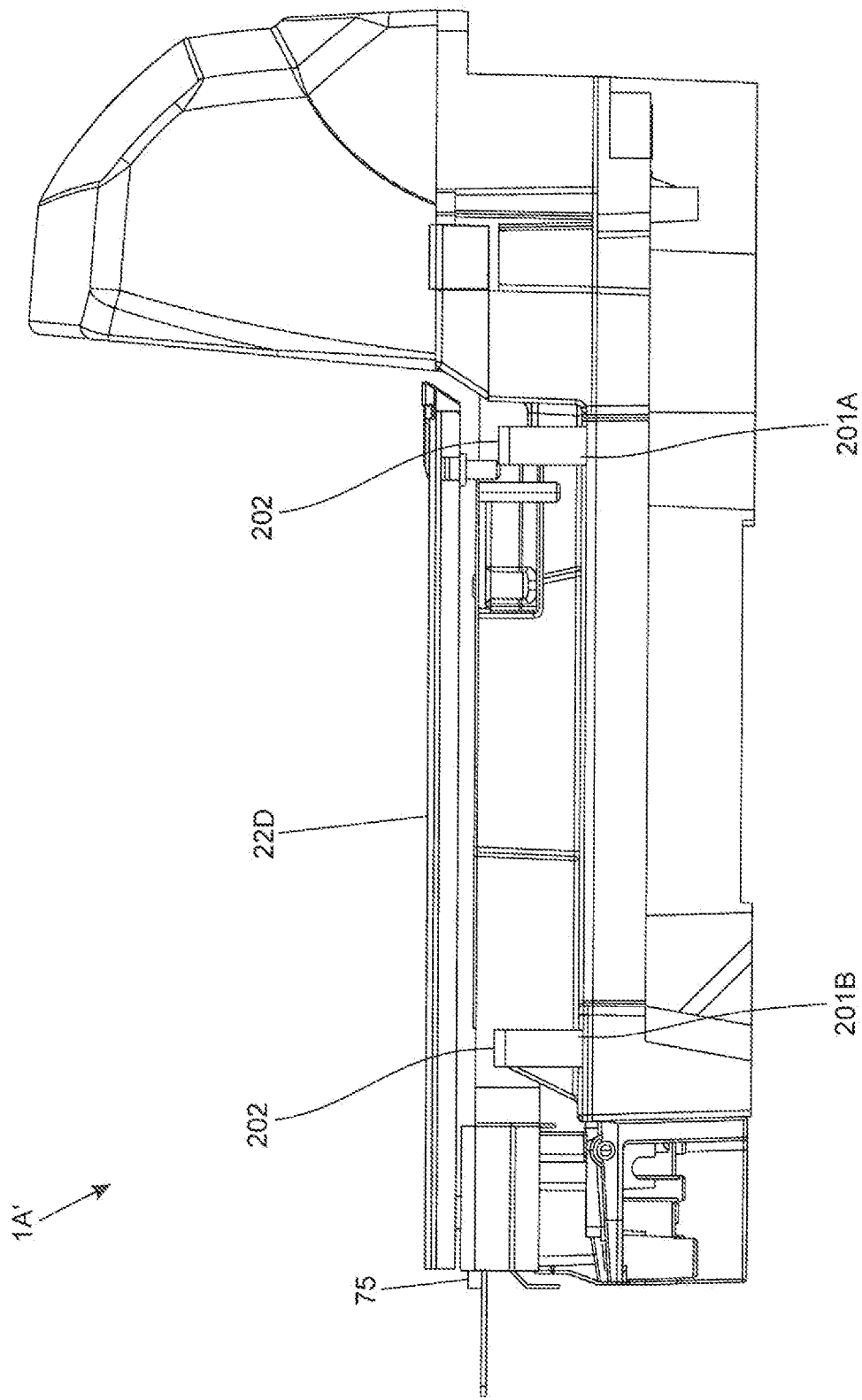

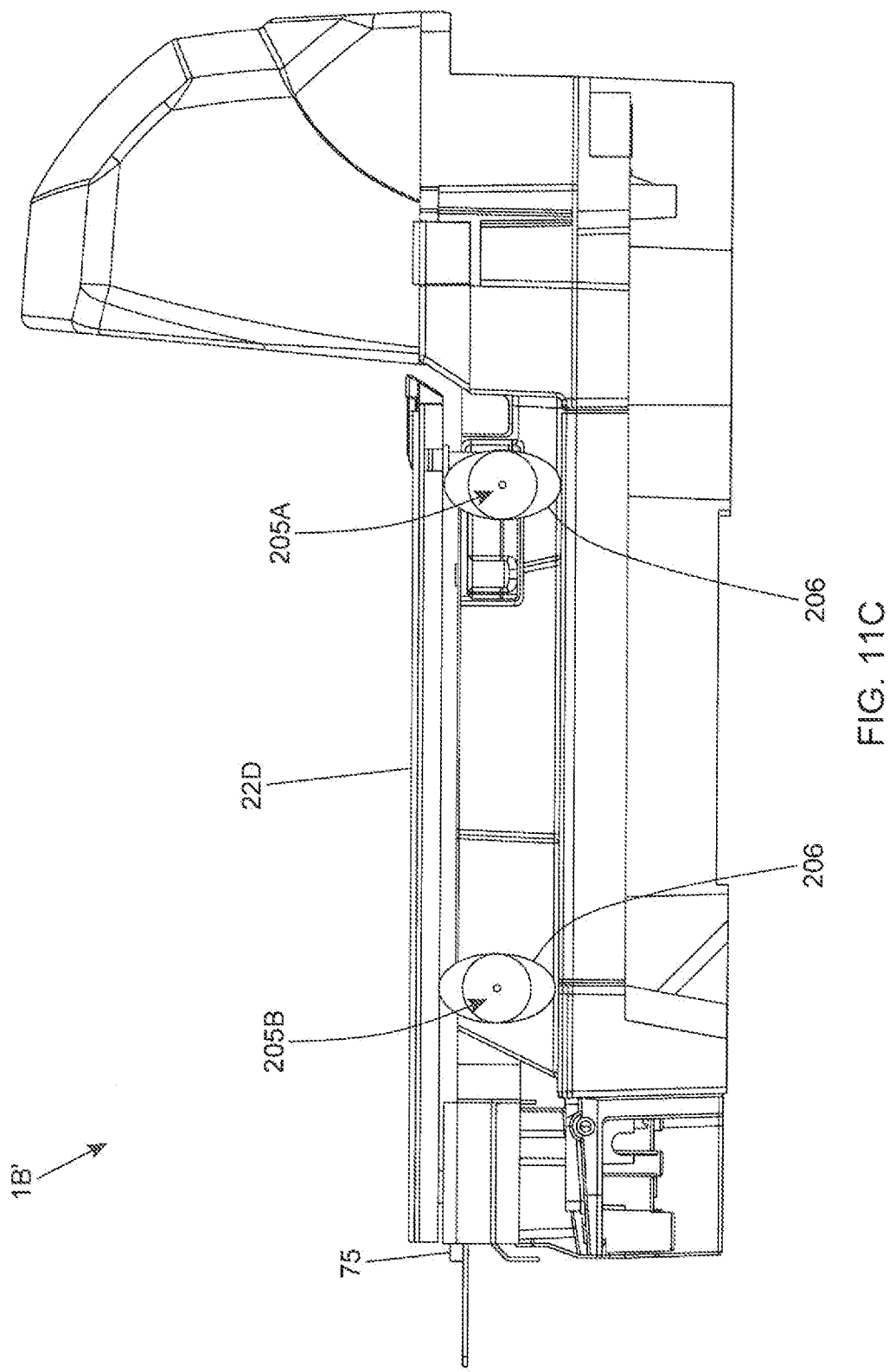

BIOPTICAL POINT OF SALE (POS) CHECKOUT SYSTEM EMPLOYING A RETRACTABLE WEIGH PLATTER SUPPORT SUBSYSTEM

BACKGROUND OF DISCLOSURE

1. Field of Disclosure

The present disclosure relates to improvements in operating bi-optical POS checkout systems employing integrated electronic weigh scales.

2. Brief Description of the State of Knowledge in the Art

The most frequent modes of failure for bi-optic products are related to the scales integrated in such POS-based systems. Also, the scale calibration process consumes the longest part of most bi-optic service calls relating to the scales.

In most conventional bioptical scanner/scale systems, it is believed that the load cell and cantilever arm arrangement has contributed to these problems. As each product is dragged across the platter, the cantilever arms are flexed causing stress on the load cell even when the product is not weighed. For heavy consumer products that are not intended to be weighed on the platter, but get dragged across the weigh platter, and over-stress the cantilever arms, the cantilever arms and load cell arrangement undergoes excessive loading oftentimes contributing to excessive product weights beyond the weigh scale limit.

Thus, there is a great need in the art for an improved method of and apparatus for weighing items at POS-based checkout stations using electronic weigh scales integrated within bi-optical scanning systems, while avoiding the shortcomings and drawbacks of prior art technologies.

SUMMARY AND OBJECTS OF DISCLOSURE

Accordingly, a primary object of the present disclosure is to provide a new and improved method of eliminating or minimizing any unnecessary loading of the load cell employed in a POS-based checkout/scale system, while avoiding any shortcomings or drawbacks known in the prior art.

Another object of the present disclosure is to provide a new and improved electronic scale subsystem having an electronic load cell operably connected to a pair of cantilever arms for directly supporting the weigh platter of the POS-based checkout system, and a mechanism for directly supporting the cantilever arms so that the weigh platter does not load the electronic load cell while items are being dragged across the weigh platter during bar code symbol scanning operations at the POS-based checkout system.

Another object of the present disclosure is to provide a new and improved electronic scale subsystem having an electronic load cell operably connected to a pair of cantilever arms for directly supporting the weigh platter of the POS-based checkout system, and a mechanism for preventing the cantilever arms from being overloaded and causing the scale to go prematurely out of calibration sooner than expected during normal operation, while items are being dragged across the weigh platter during bar code symbol scanning operations at the POS-based checkout system, as well as during produce weighing operations, thereby allowing the electronic load cell of the scale subsystem to signal that an item has been dragged across the weigh platter and scanned as part of any loss prevention system.

Another object of the present disclosure is to provide a new and improved POS-based checkout/scale system having an electronic scale subsystem with a platter support configuration employing a sensor (e.g. a strain gage or other pressure sensor) that is incorporated into the loss prevention system, wherein the sole function of this sensor is to indicate that an item has been dragged across the weigh platter, and thus the calibration of this sensor is of less importance and would not need to be recalibrated on as frequent of a basis.

Another object of the present disclosure is to provide a new and improved POS-based checkout/scale system, wherein when an item is placed on the weigh platter of the electronic scale subsystem to be weighed, the sensor (e.g. a strain gage or other pressure sensor) automatically detects the weight of the item for a specific amount of time, and then the weigh platter supports are automatically retracted to allow the electronic scale subsystem to operate normally.

Another object of the present disclosure is to provide a new and improved POS-based checkout/scale system, wherein when an item is placed on the weigh platter of the electronic scale subsystem to be weighed, the operator manually causes the weigh platter supports to be refracted to allow the electronic scale subsystem to operate normally.

These and other objects will become apparent hereinafter and in the claims.

BRIEF DESCRIPTION OF THE DRAWINGS

In order to more fully understand the Objects, the following Detailed Description of the Illustrative Embodiments should be read in conjunction with the accompanying figure Drawings in which:

FIG. 1A shows a perspective view of a first generalized embodiment of a bi-optical POS-based checkout/scale system equipped with an integrated electronic weigh scale subsystem having an electronically-controlled powered cantilever-type arm support mechanism which is programmed to support the cantilever arms until an item placed on the weigh platter surface is automatically detected by an automatic weigh function detection subsystem;

FIG. 1B is an elevated side view of the POS-based checkout/scale system of FIG. 1A;

FIG. 1C is an elevated side end view of the POS-based checkout/scale system shown in FIGS. 1A and 1B;

FIG. 5B is an elevated side view of the POS-based checkout/scale system of FIGS. 1A, 3 and 5A, showing its weigh platter removed from and revealing the cantilever arms of the integrated electronic weigh scale subsystem, physically unsupported by the electronically-controlled powered mechanism for lifting the cantilever arms of the weigh scale subsystem;

FIG. 7A shows a perspective view of a second generalized embodiment of a bi-optical POS-based checkout/scale system equipped with an integrated electronic weigh scale subsystem having an electronically-controlled weigh platter support mechanism which is programmed to support the weigh platter until an item placed on the weigh platter surface is automatically detected by an automatic weigh function detection subsystem;

FIG. 7B is an elevated side view of the POS-based checkout/scale system of FIG. 7A;

FIG. 7C is an elevated side end view of the POS-based checkout/scale system shown in FIGS. 7A and 7B;

FIG. 8A is a perspective view of the electronic weigh scale subsystem detached from the POS-based checkout/scale system of FIG. 7A, and showing its load cell module and pair of cantilever arms extending therefrom adapted to support the weigh platter removed therefrom for purposes of illustration;

FIG. 8B is an elevated end view of the electronic weigh scale subsystem shown in FIG. 8A;

FIG. 8C is an elevated side view of the electronic weigh scale subsystem shown in FIG. 8A;

FIG. 10B is an elevated side view of the POS-based checkout/scale system of FIGS. 7A, 9 and 10A, showing its cantilever arms removed and revealing the weigh platter of the integrated electronic weigh scale subsystem, unsupported by the electronically-controlled piston-based powered mechanism for lifting the cantilever arms of the weigh scale subsystem;

FIG. 11C is an elevated side view of the POS-based checkout/scale system of FIG. 7A, 9 and 11A showing its cantilever scale arms removed and revealing the cam-based powered mechanism for supporting the integrated electronic weigh scale subsystem, physically supported by the electronically-controlled powered mechanism for lifting the weigh platter of the weigh scale subsystem.

DETAILED DESCRIPTION OF THE ILLUSTRATIVE EMBODIMENTS

Figure 2A:
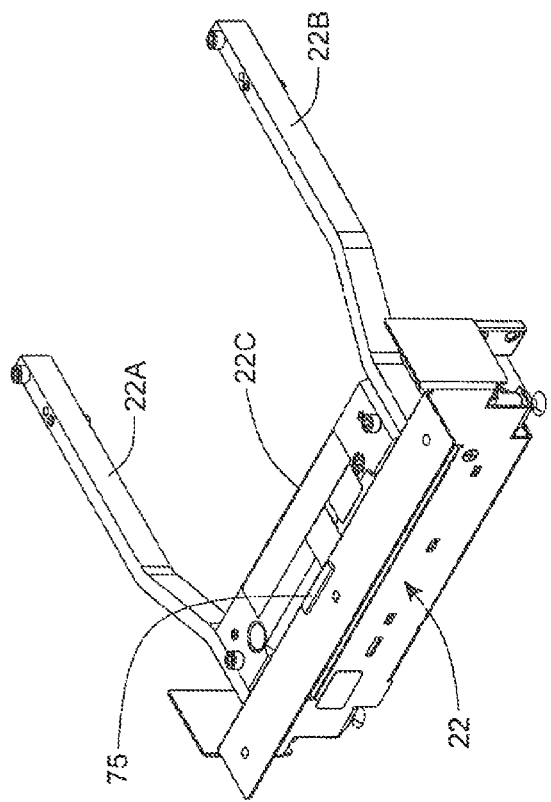
FIG. 2A is a perspective view of the electronic weigh scale subsystem detached from the POS-based checkout/scale system of FIG. 1A, and showing its load cell module and pair of cantilever arms extending therefrom adapted to support the weigh platter removed therefrom for purposes of illustration.

Referring to the figures in the accompanying Drawings, the various illustrative embodiments of the apparatus and methodologies will be described in great detail, wherein like elements will be indicated using like reference numerals.

For purpose of illustration, the present disclosure provides two generalized embodiments of the POS-based checkout/scale system having a bar code symbol reading subsystem integrated with an electronic weigh scale subsystem, in a bi-optical housing arrangement. It is understood that other generalized embodiments are possible, and various ways of implementing the bar code symbol reading subsystem, including laser scanning, digital imaging and hybrid techniques, disclosed in copending U.S. patent application Ser. No. 13/160,873 filed Jun. 15, 2011 and incorporated herein by reference.

In the POS-based checkout/scale system 1, the integrated electronic weigh scale subsystem 22 has an automatic weigh function detection subsystem 116, and an electronically-controlled powered mechanism 100 for lifting or supporting either the cantilever scale arms 22A, 22B of the weigh scale subsystem or its weigh platter 22D, so as to disable weight measurement until it has been determined that an item has been positioned on the weigh platter for weight measurement. When this condition has been determined, the electronically-controlled powered mechanism 100 allows the cantilever scale arms of the weigh scale subsystem, and its weigh platter, to bear the full weight of the weigh scale and any items disposed thereon, and accurate weight measurement to occur using the electronic weigh scale subsystem 22.

As will be described in detail hereinabove, the electronically-controlled powered mechanism 100 can be implemented in a number of ways, using arrangement of solenoids and/or cams for supporting the weigh platter or cantilever-type scale weigh arms.

First Generalized Bi-Optical POS-Based Checkout/Scale System

FIGS. 1A through 1C show the first generalized embodiment of the bi-optical POS-based checkout/scale system 1. As shown, the POS-based system 1 is equipped with an integrated electronic weigh scale subsystem 22 having a powered cantilever arm support subsystem 100. This powered cantilever arm support subsystem 100 is programmed to rapidly support the cantilever-type scale weigh arms 22A and 22B (and thus the weigh platter 22D) so that minimal load is experienced by the electronic load cell module 22C of the weigh scale subsystem 22 until one or more items placed on the weigh platter surface 22D are automatically detected by an automatic weigh function detection subsystem 106. When this event is detected, the powered cantilever arm support mechanism 100 automatically and rapidly allows the cantilever weigh arms 22A and 22B to bear the full weight of the weigh platter 22D and any items supported thereon, so that the electronic load cell module 22C of the weigh subsystem 22 can accurately measure the weight of items on the weigh platter 22, and then transmit corresponding weigh data (i.e. weight measurements) to the host computer system 9, at the POS station.

Figure 2C:
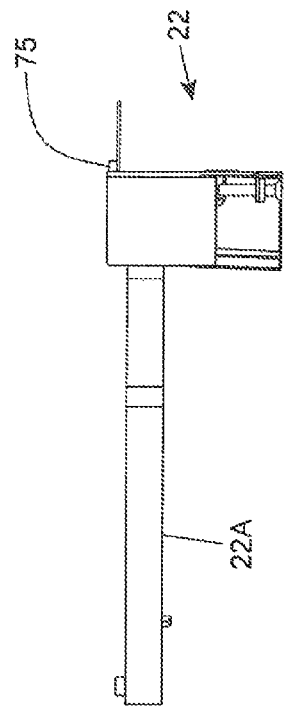
FIG. 2C is an elevated side view of the electronic weigh scale subsystem shown in FIG. 2A.
Figure 2B:
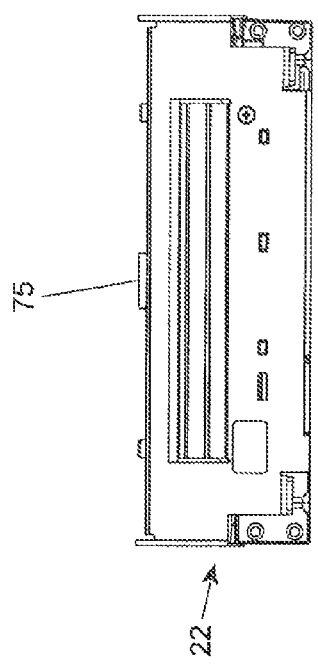
FIG. 2B is an elevated end view of the electronic weigh scale subsystem shown in FIG. 2A.

Referring to FIGS. 2A through 2C, the electronic weigh scale subsystem 22 is shown detached from the POS-based checkout/scale system 1 of FIG. 1A. As shown, the pair of cantilever arms 22A and 22B extend from the electronic load cell module 22C, and are adapted to support the weigh platter 22D. An exemplary electronic weigh scale subsystem employing cantilever-type weigh arms, suitable for use with bar code scanning systems as shown in FIGS. 1A through 1C, is commercially available from Mettler-Toledo, GmbH. However, it is expected that other types of electronic weigh scale systems can be used with good performance results.

In the illustrative embodiment shown in FIGS. 1A, 1B and 1C, bar code symbol reading subsystem 150, employing laser scanning stations 150A and 150B, is embedded in a system housing 2 having a vertical housing section 2A with a vertical optically transparent (glass) scanning window 3A, and a horizontal housing section 2B with a horizontal optically transparent (glass) scanning window 3B. Typically, the system 1 is installed within a countertop surface, at a retail point of sale (POS) checkout station, in a manner well known in the art. The retail POS station will oftentimes have a conveyor belt for moving products towards the POS-based checkout/scale system 1. Also a host computer system 9 is also provided at the POS station, and is connected to the retailer's LAN and/or WAN on which one or more product price database systems (RDBMS) 33 will be deployed.

As shown in FIGS. 1A through 1C, the horizontal and vertical sections 2A and 2B of the system housing are arranged in an orthogonal relationship with respect to each other such that the horizontal and vertical scanning windows 3A and 3B are substantially perpendicular.

Figure 3:
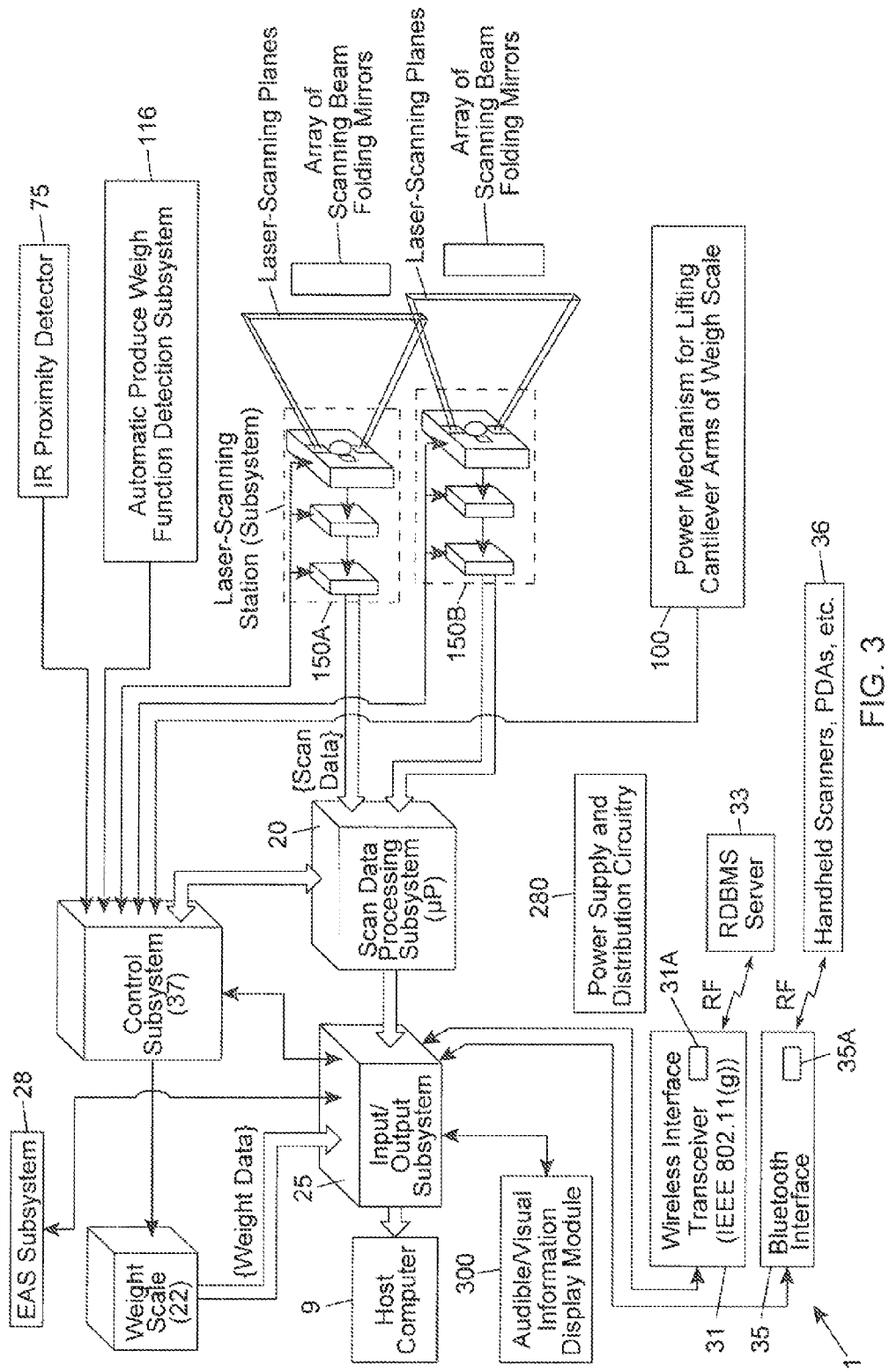
FIG. 3 is a schematic diagram showing the system subcomponents of POS-based checkout/scale system of FIG. 1A, equipped with its integrated electronic weigh scale subsystem having an automatic weigh function detection subsystem and an electronically-controlled powered mechanism for lifting the cantilever arms of the weigh scale subsystem.

As shown in the system schematic diagram of FIG. 3, first and second laser scanning stations 150A and 150B, is mounted within the system housing, and generates and projects a complex groups of laser scanning planes through laser scanning windows 3A and 3B. In the illustrative embodiment, these laser scanning planes intersect and produce an omni-directional laser scanning pattern within a 3D scanning volume 500 defined between the vertical and horizontal scanning windows 3A and 3B, as shown in FIGS. 1 and 1C. As shown FIG. 1A, the 3D scanning volume 500 is generally bounded by the vertical scanning window 3A and the horizontal scanning window 3B. In the illustrative embodiment, each laser scanning station 150A, 150B is constructed from a rotating polygon, a laser diode source, light collection optics, a photodiode, and other optical components, such as arrays of scanning beam folding mirrors, arranged as disclosed in U.S. Pat. No. 7,422,156, incorporated herein by reference, as if set forth fully herein.

As shown in FIG. 1A, an IR-based proximity detector 75 is mounted in the front portion of horizontal housing portion 2B for automatically detecting the presence of a human operator in front of the 3D scanning volume during system operation. The function of the IR-based proximity detector 75 is to wake up the system (i.e. WAKE UP MODE), and cause a SLEEP Timer (T1) to be set to count how long the system has to read a bar code symbol (e.g. 15 minutes) before the system is automatically induced into its SLEEP MODE, where the polygon scanning element and laser diodes are deactivated to conserve electrical within the system. Preferably, the IR-based proximity (i.e. wake-up) detector 75 is realized using (i) an IR photo-transmitter for generating a high-frequency amplitude modulated IR beam, and (ii) a IR photo-receiver for receiving reflections of the amplitude modulated IR beam, using a synchronous detection circuitry, well known in the art.

As shown in FIG. 3, POS-based checkout/scale system comprises the system subcomponents; bar code symbol reading subsystem 150 including laser scanning stations 150A and 150B for generating and projecting groups of laser scanning planes through the vertical and horizontal scanning windows 3A and 3B, respectively, and generating scan data streams from scanning objects in the 3D scanning volume 500; a scan data processing subsystem (i.e. scan data processor) 20 for supporting automatic scan data processing based bar code symbol reading using scan data streams generated from stations 150A and 150B; electronic weigh scale subsystem 22; automatic weigh function detection subsystem 116 for automatically detecting that one or more items have been placed on the weigh platter 22D for weighing, and generating control signals upon the automatic detection of certain weigh platter loading events; electronically-controlled powered mechanism 100 for lifting the cantilever-type weigh scale arms 22A and 22B and thus the weigh platter 22D supported thereby so that that the electronic load cell module 22C is not loaded during non-weighing operations (i.e. bar code symbol scanning and checkout operations) supported at the POS-based checkout/scale system 1; a BlueTooth® RF 2-way communication interface 35 including RF transceivers and antennas for connecting to Blue-tooth® enabled handheld scanners, imagers, PDAs, portable computers 36 and the like, for control, management, application and diagnostic purposes; IR-based wake-up detector 75 operably connected to the control subsystem (i.e. system controller) 37 for generating and supplying a trigger signal to the system controller in response to automatic detection of an operator in proximity (e.g. 1-2 feet) of the system housing; Electronic Article Surveillance (EAS) subsystem 28 (including a Sensormatic® EAS tag deactivation block 29 integrated in system; an audible/visual information display subsystem (i.e. module) 300; an input/output subsystem 25 for interfacing with the image processing subsystem 20, the electronic weigh scale subsystem 22, Electronic Article Surveillance (EAS) Subsystem 28 and audible/visual information display module 300, and supporting universal, standard and/or proprietary data communication interfaces with host system 9 and other external devices.

Figure 3B:
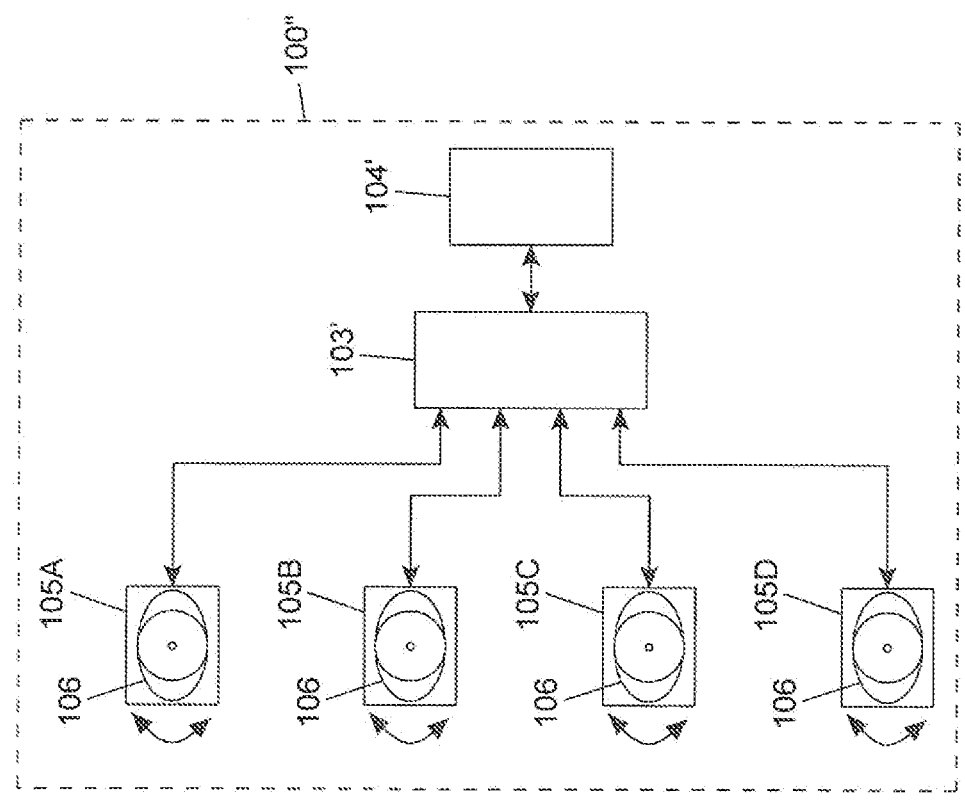
FIG. 3B is a schematic representation of a second illustrative embodiment of the power mechanism for lifting the cantilever arms of the weigh scale subsystem, using rotary driven devices, depicted in the system diagram of FIG. 3.
Figure 3A:
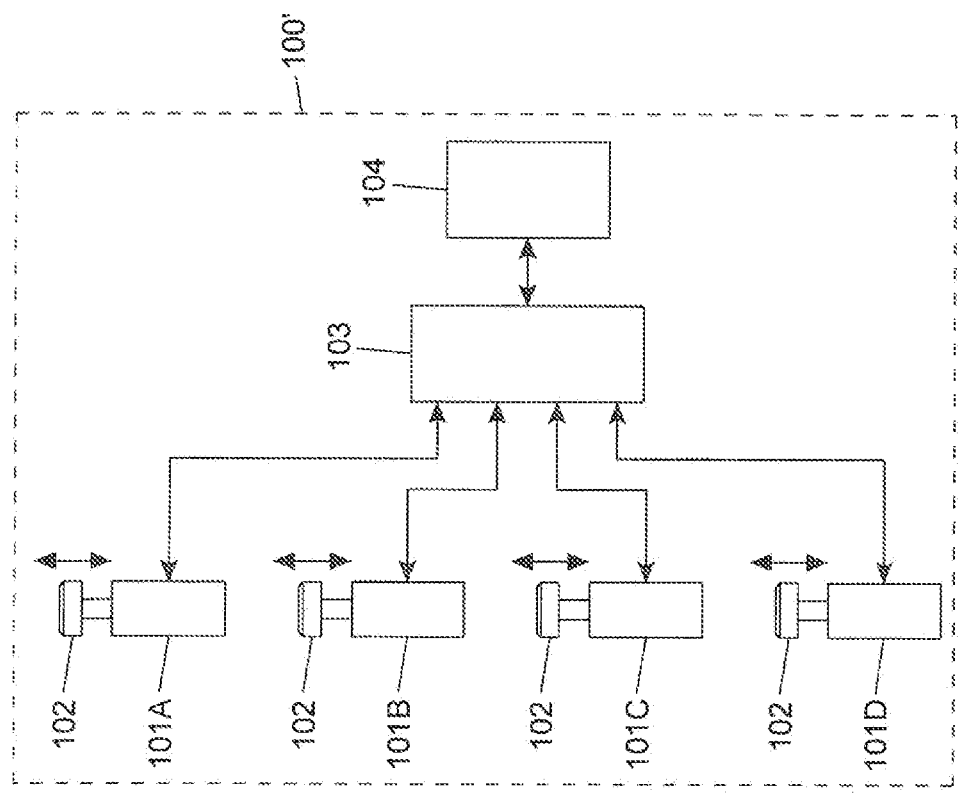
FIG. 3A is a schematic representation of a first illustrative embodiment of the power mechanism for lifting the cantilever arms if the weigh scale subsystem, using linear motor driven devices, depicted in the system diagram of FIG. 3.
Figure 4A:
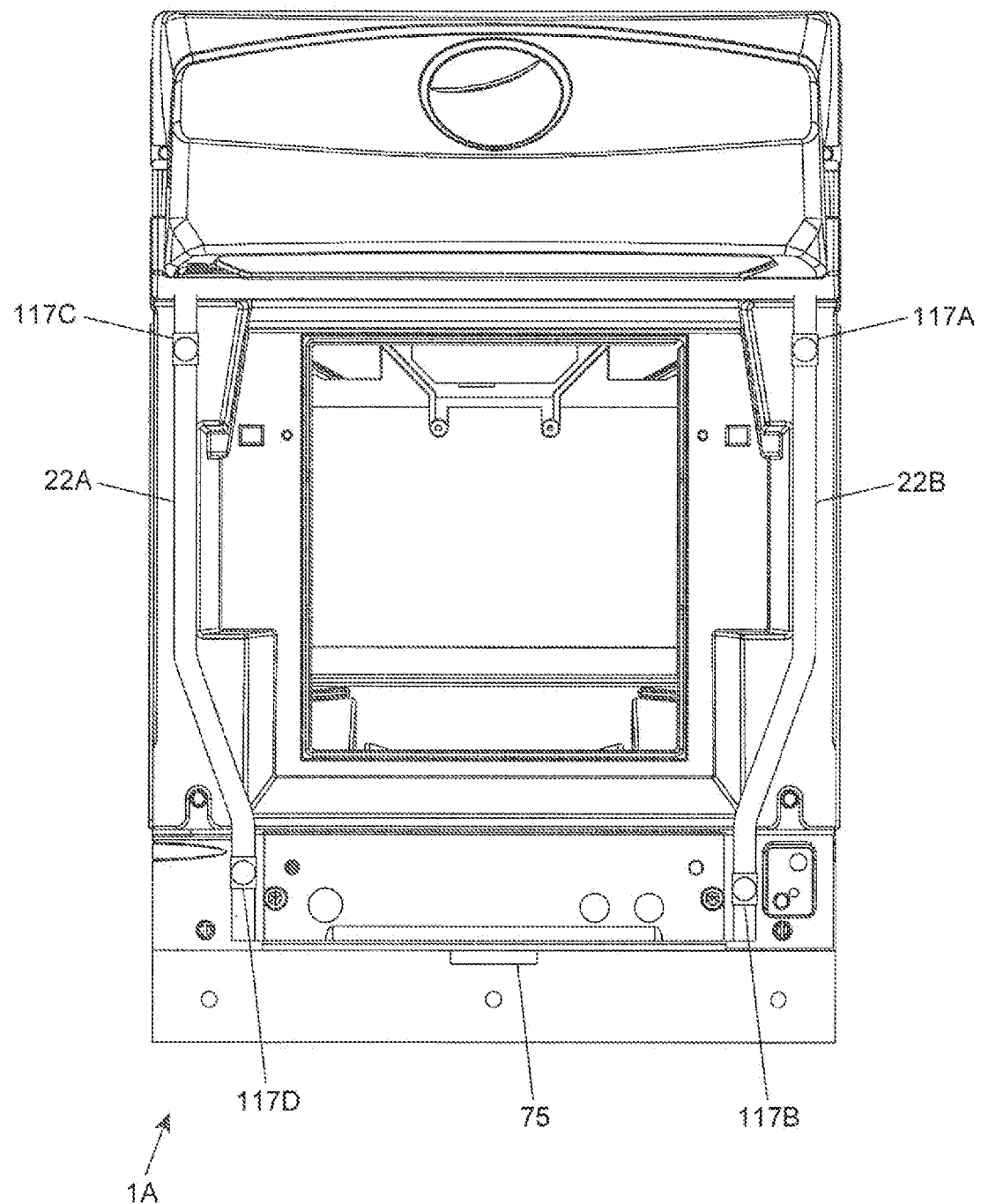
FIG. 4A is a plan view of a first illustrative embodiment of the first generalized POS-based checkout/scale system shown in FIGS. 1A and 3, wherein its weigh platter is removed revealing the cantilever arms of the integrated electronic weigh scale subsystem, physically supported by an electronically-controlled piston-based powered mechanism until its automatic weigh function detection subsystem detects an object of sufficient weight on the weigh platter for a predetermined time period, and then automatically retracts support of the cantilever arms and allows normal weight measurement on the weigh platter.
Figure 4B:
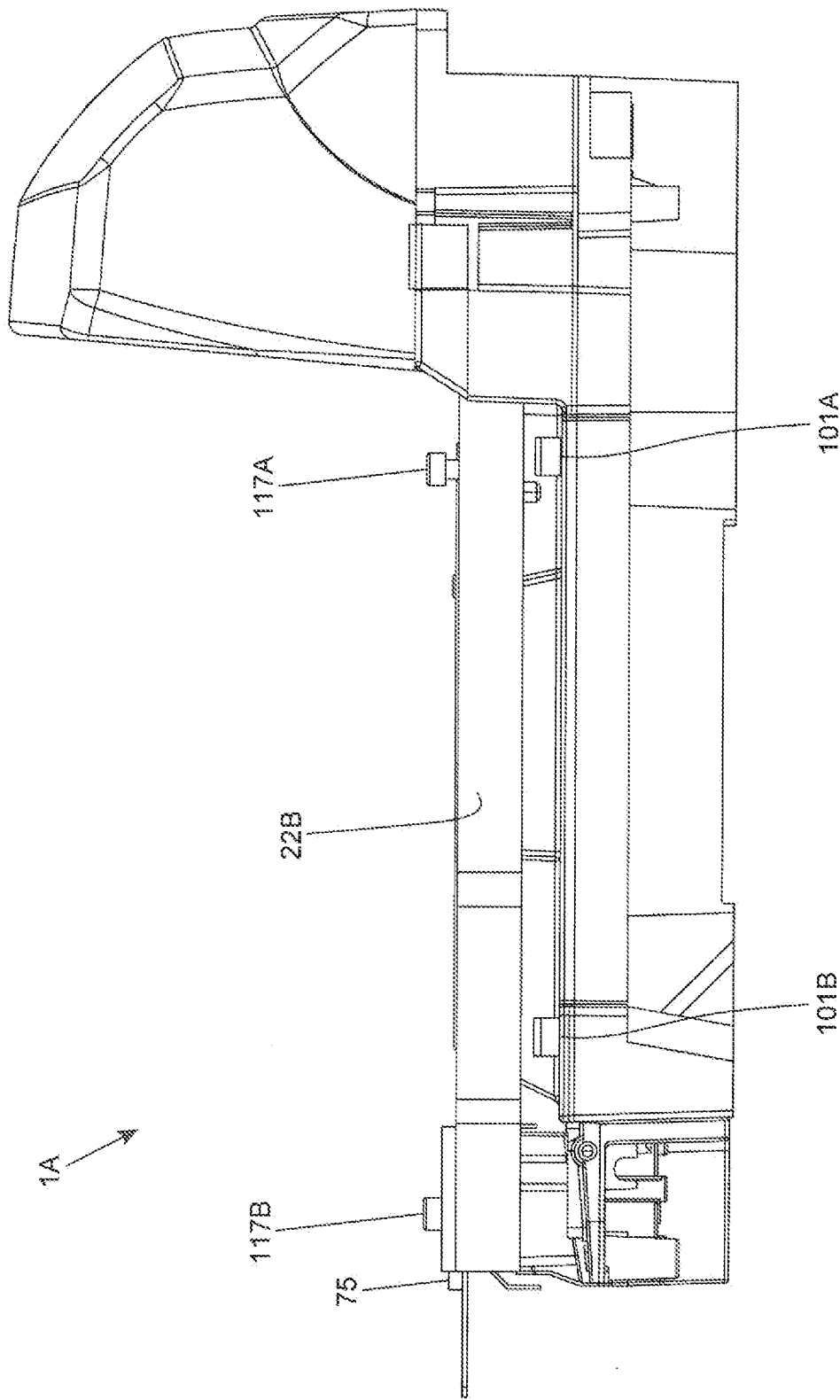
FIG. 4B is an elevated side view of the POS-based checkout/scale system of FIGS. 1A, 3 and 4A, showing its weigh platter removed from and revealing the cantilever arms of the integrated electronic weigh scale subsystem, unsupported by the electronically-controlled piston-based powered mechanism for lifting the cantilever arms of the weigh scale subsystem.
Figure 4C:
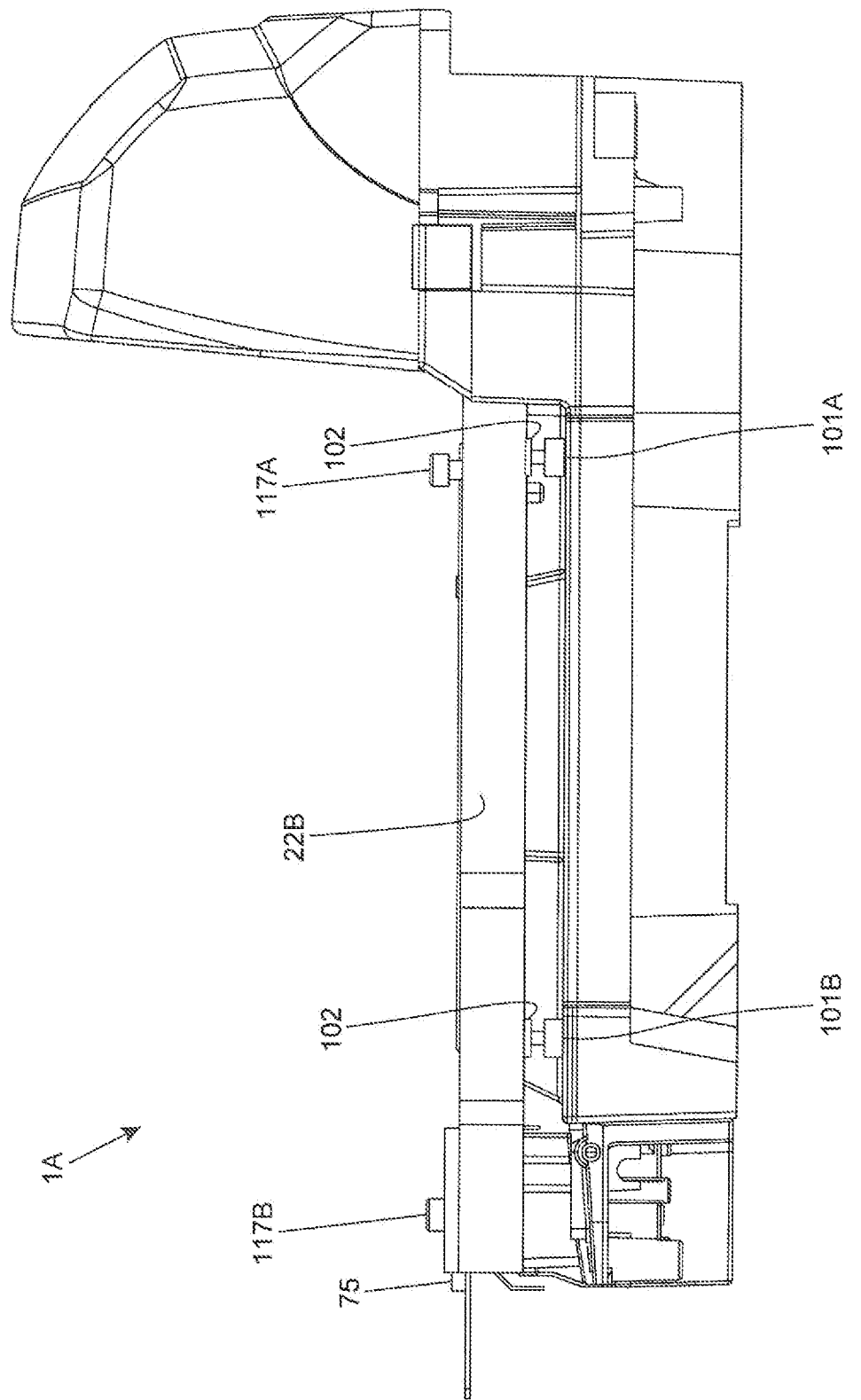
FIG. 4C is an elevated side view of the POS-based checkout/scale system of FIGS. 1A, 3 and 4A showing its weigh platter removed from and revealing the cantilever arms of the integrated electronic weigh scale subsystem, supported by the electronically-controlled piston-based powered mechanism for lifting the cantilever arms of the weigh scale subsystem and allowing the cantilever arms to bear the full weigh of objects supported on the weigh platter during weighing operations.

First Illustrative Embodiment of the First Generalized POS-Based Checkout/Scale System FIGS. 4A through 4C depict a first illustrative embodiment of the first generalized POS-based checkout/scale system 1A shown in FIGS. 1A and 3, wherein its weigh platter 22D is removed revealing the cantilever-type weigh scale arms 22A and 22B of the electronic weigh scale subsystem 22. As shown, the cantilever-type weigh scale arms 22A and 22B are physically supported by an electronically-controlled piston-based powered mechanism 100', shown in FIG. 3A, until its automatic weigh function detection subsystem 116, shown in FIG. 13C, automatically detects an object of sufficient weight on the weigh platter 22D for a predetermined time period, and then automatically retracts support of the cantilever arms and allows normal weight measurement on the weigh platter to take place.

In general, there are various ways in which the cantilever-type weigh scale arms 22A and 22B can be lifted, or supported, to effectively minimize the forces exerted on the load cell module 22C during non-weighing operations supported on the POS-based checkout/scale system of FIGS. 4A and 4B.

For example, as shown in FIGS. 4A, 4B and 4C, the cantilever-type scale arms 22A and 22B are supported by four linear-actuated pistons 101A through 101D, each of which is located beneath one end of one of the cantilever support arms, as shown. Using this four point support method, weight bearing forces generated by the weigh platter 22D and objects placed thereon can be effectively counter-acted along the cantilever-type weigh scale arms 22A and 22B and not experienced by the electronic load measuring cell 22C. However, if only one piston-type support mechanism 100' is to be used per cantilever-type scale weigh arm 22A (22B), then preferably the piston-based support mechanism should be placed at the end of the arm opposite the load cell module 22C. When supporting the cantilever-type scale arms using piston-type support mechanisms described above, particular care must be taken not to exert force on the cantilever-type weigh scale arms 22A and 22B that would distort or damage the electronic load cell 22C. To minimize the chances of this occurring, force feedback can be used to minimize the forces exerted on the cantilever-type weigh scale arms.

The above piston-based mechanisms can be implemented as four discrete systems, such as four independent linear actuators or (linear stepper) motors, or as part of an integrated drive train. Alternatively, one linear actuator could drive a rack gear which drives two pinions associated with cams that lift and support the cantilever-type scale arms. In such a scenario, only two drive mechanisms would be needed instead of four independent systems.

As shown in the illustrative embodiment 1A shown in FIGS. 4A through 4C, each piston-based lifting mechanism 101A through 101D is realized as linear-actuated motor or linear stepper motor. Each piston-based lifting mechanism 101A through 101D receives drive signals from interface circuitry 103 and is controlled by programmed microcontroller 104. As each linear stepper motor incrementally and synchronously advances along its linear axis, the respective lifters 102 exert a force upon and lifts the cantilever-type weigh arms 22A and 22B at the four points of support, and thus the weigh platter 22D supported thereupon. Typically, during a complete lifting and lowering cycle, the lifter 102 starts out as shown in FIG. 4B, requiring the piston (i.e. linear stepper motor) to lift the cantilever-type weigh arms 22A, 22B, as shown in FIG. 4C, to a non-weighing position. Then after moving the lifters down as shown in FIG. 4C, the cantilever arms are not supported and are configured in a normal weighing position.

The above cantilever arm lifting process is performed each time the automatic weigh function detection subsystem 116 detects a non-weighing event on the weigh platter (i.e. no item detected on the weigh platter), and the cantilever arm lowering process is performed each time the automatic weigh function detection subsystem 116 detects a weighing event on the platter (i.e. items detected on the weigh platter).

Figure 3C:
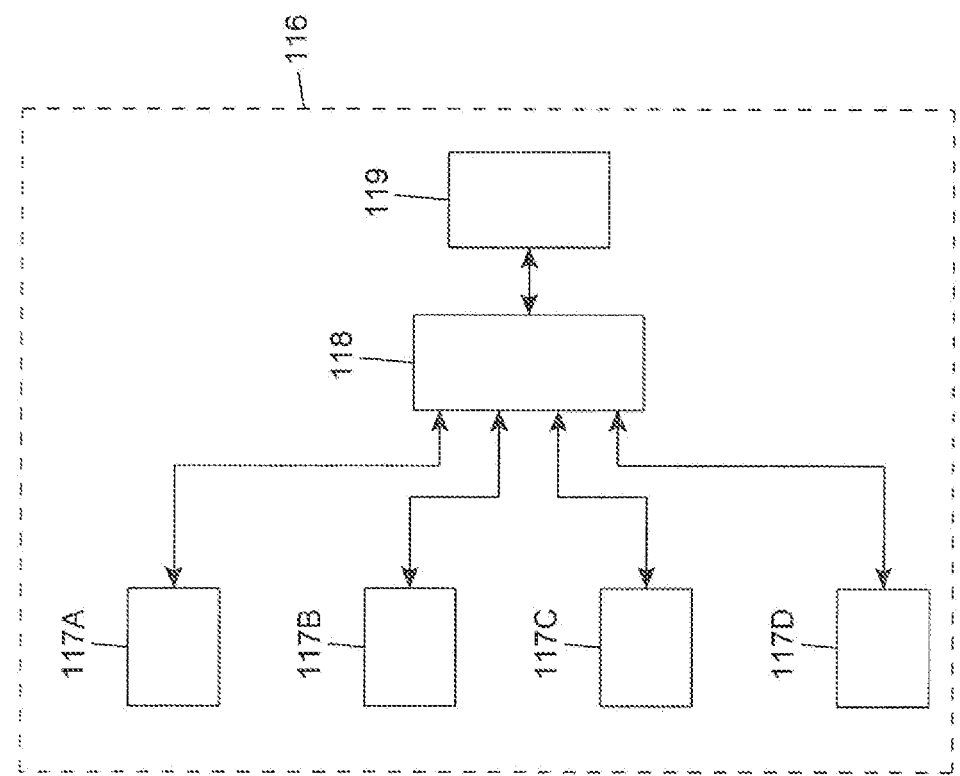
FIG. 3C is a schematic representation of an illustrative embodiment of the automatic produce weigh function detection subsystem, depicted in the system diagram of FIG. 3.

Preferably, as shown in FIG. 3C, the automatic weigh function detection subsystem 116 is realized by installing a piezo-electric strain-gauge device 117A, (117B, 117C and 117D) between each of the four points of contact between the weigh platter 22D and the cantilever-type weigh scale arms 22A and 22B, and then connecting these piezo-electric strain-gauge devices to electrical interface circuitry 118 that converts analog electrical pressure signals into corresponding digital electrical signals that are supplied to the input ports of a programmed digital signal processing (DSP) chip 119. In turn, DSP chip 119 is interfaced with system controller 37, shown in FIG. 3.

The primary function of these piezo-electric strain-gauge devices 117A through 117D is to monitor (in real-time) pressure forces exerted on these gauges by the weigh platter 22D, over time, and generate corresponding analog electrical voltage signals which are digitized by interface circuitry 118, so that corresponding digital signals can be analyzed by the digital signal processing (DSP) chip 119, for the purpose of automatically detecting (i) non-weighing (including scanning) events, as well as normal (ii) weighing events supported on the weigh platter 22D of the POS-based checkout/scale system 1A.

These piezo-electric strain-gauges 117A through 117D and interface circuitry 118 should be calibrated for the purpose of detecting such weighing and non-weighing (i.e. scanning) events across the weigh platter of the POS-based checkout/scale system 1A, but not necessarily for accurately detecting the true weight of produce and other items being weighed on the weigh platter for purchase purposes. Preferably, the calibration process will also set the upper weight limits that the weigh scale subsystem 22 is capable of weighing, and that the strain-gauges are able to detect when such conditions are exceeded, causing the weigh platter to be automatically lifted by the powered lifting mechanism 100' installed in the system. Routine experimentation will be required to calibrate the piezo-electric strain-gauge devices 117A through 117D for the purposes of the automatic weigh function detection subsystem 116. The DSP 119 can be programmed in a straightforward manner to automatically detect: (i) non-weighing (including scanning) events supported on the weigh platter 22D of the POS-based checkout/scale system 1A when only transient-type pressure signals are generated from the piezo-electric strain-gauge devices 117A through 117D, indicating non-weighing and code symbol reading events being performed at the POS-based checkout/scale system; and (ii) normal weighing events supported on the weigh platter 22D of the POS-based checkout/scale system when only non-transient (i.e. steady-state) pressure signals are generated from the piezo-electric strain-gauge devices 117A through 117D, indicating weighing events being performed at the POS-based checkout/scale system.

The above powered cantilever lifting mechanism can be implemented as discrete systems, such as four independent linear actuators, or as part of an integrated drive train. For instance one actuator could drive a rack gear that drives two pinions associated with cams to lift the platter or support the scale arm. In such a scenario only two drive mechanisms would be needed instead of four independent systems.

Figure 5A:
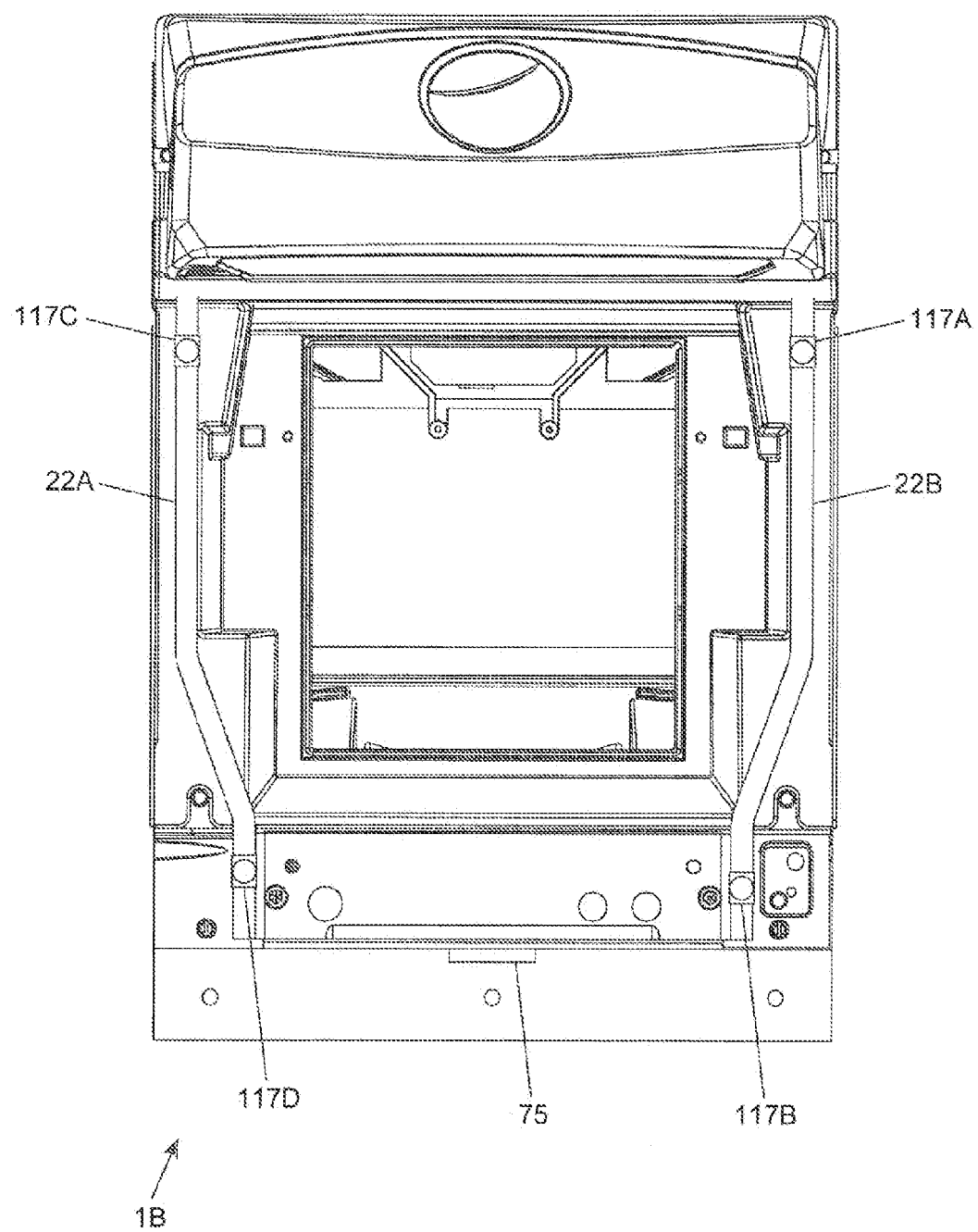
FIG. 5A is plan view of a second illustrative embodiment of the first generalized embodiment of the POS-based checkout/scale system shown in FIGS. 1A and 3, wherein its weigh platter is removed revealing the cantilever arms of the integrated electronic weigh scale subsystem, physically supported by an electronically-controlled cam-based powered mechanism until an electronic strain gauge associated with its automatic weigh function detection subsystem detects an object of sufficient weight on the weigh platter for a predetermined time period and then automatically retracts support of the cantilever arms and allows normal weight measurement on the weigh platter.
Figure 5C:
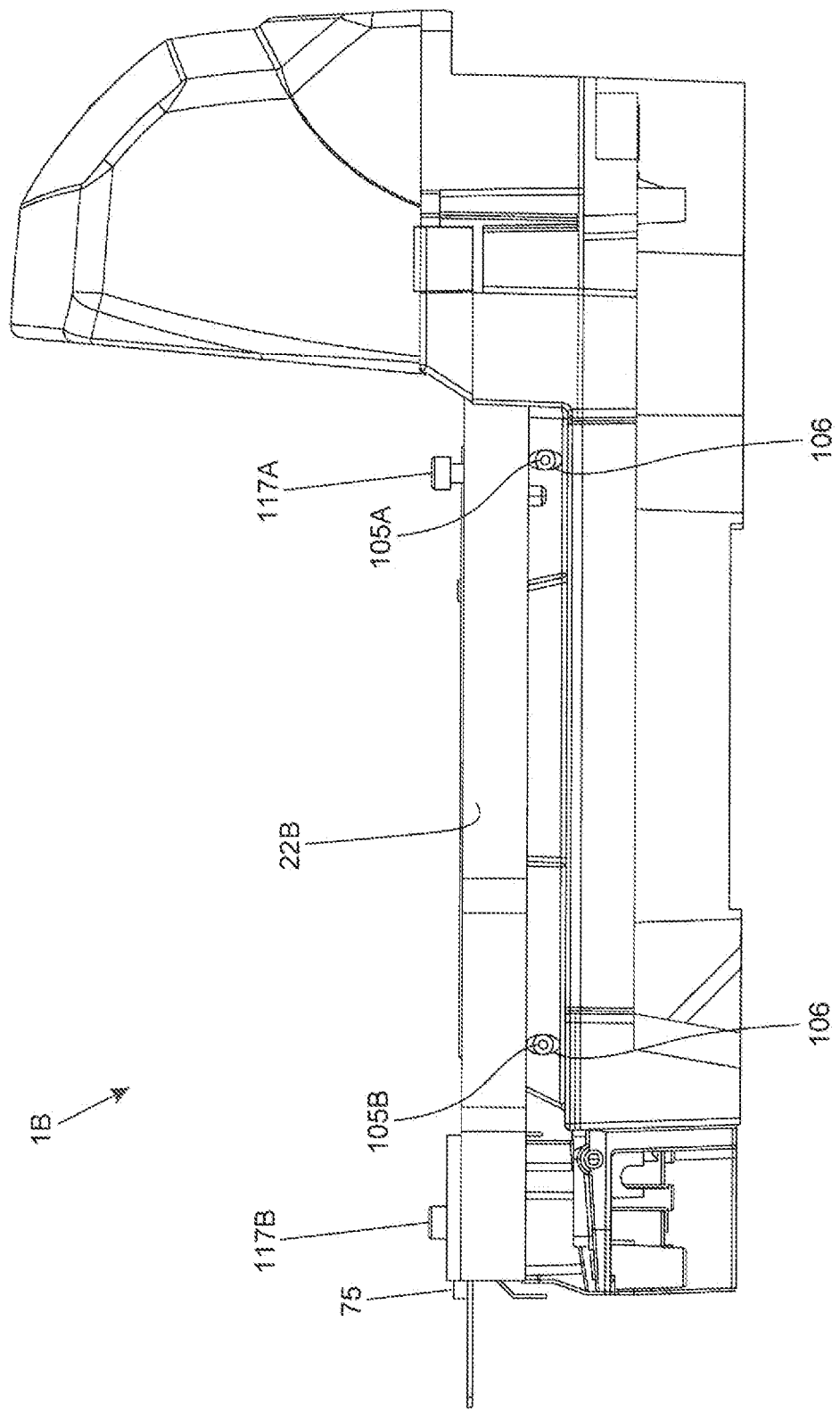
FIG. 5C is an elevated side view of the POS-based checkout/scale system of FIGS. 1A, 3 and 5A showing its weigh platter removed from and revealing the cantilever arms of the integrated electronic weigh scale subsystem, physically supported by the electronically-controlled powered mechanism for lifting the cantilever arms of the weigh scale subsystem.

Second Illustrative Embodiment of the First Generalized Bi-Optical POS-Based Checkout/Scale System FIGS. 5A through 5C show a second illustrative embodiment 1B of the first generalized POS-based checkout/scale system of FIGS. 1A and 3, wherein its weigh platter 22D is removed revealing the cantilever arms of the integrated electronic weigh scale subsystem 22.

As shown, the cantilever-type weigh scale arms are physically supported by an cam-based powered cantilever arm lifting mechanism 100" until its automatic weigh function detection subsystem 116 automatically detects an object of sufficient weight on the weigh platter for a predetermined time period and then automatically retracts support of the cantilever arms and allows normal weight measurement on the weigh platter 22D.

In general, there are various ways in which the cantilever-type weigh scale arms 22A and 22B can be lifted, and minimizing weigh platter generated forces exerted on the load cell module 22C, during non-weighing operations supported on the POS-based checkout/scale system 1B.

For example, as shown in FIGS. 3B, 5A, 5B and 5C, the cantilever-type scale arms 22A and 22B are supported by four rotatable cam-based lifting mechanisms 100" using either a four point support method, wherein one cam-type mechanism is located beneath each end of the cantilever support arms, as shown. However, if only one cam-based support mechanism is to be used per cantilever-type scale weigh arm, then the cam-based support mechanism is preferably placed at the end of the arm opposite the load cell module.

As shown in FIGS. 3B, 5B and 5C, each cam-based lifting mechanism 105A through 105D is realized as an oval disc 106 mounted on the shaft of an electronically-controlled stepper motor 101. Each cam-based lifting mechanism 105A through 105D receives drive signals from interface circuitry 103' and is controlled by programmed microcontroller 104'. As the motor shaft rotates, so does the oval disc 106, exerting force upon and lifting the cantilever-type weigh arms 22A and 22B when the shaft reaches it's a predetermined angular rotation, at which the major axis of the oval disc is substantially normal to the weigh platter surface 22. Typically, during a complete lifting and lowering cycle, the oval disc 106 starts out as shown in FIG. 5B, requiring 90 degrees clock-wise rotation to lift the cantilever-type weigh arms, 22A, 22B as shown in FIG. 5C, to a non-weighing position. Then after being rotated by another 90 degrees of rotation, to the cantilever arms are lowered back down to a normal weighing position. Then when rotating the oval disc 106 another 90 degrees clockwise, the cantilever arms will be lifted once again into the non-weighing position. Then, upon another 90 degree rotation of the stepper motor shaft, the cantilever arms will be lowered to their non-weighing position.

The above cantilever arm lifting process is performed each time the automatic weigh function detection subsystem 116 detects a non-weighing event on the weigh platter (i.e. no item detected on the weigh platter), and the cantilever arm lowering process is performed each time the automatic weigh function detection subsystem 116 detects a weighing event on the platter (i.e. items detected on the weigh platter 22D).

Preferably, as shown in FIG. 3C, the automatic weigh function detection subsystem 116 is realized by installing a piezo-electric strain-gauge device 117A, (117B, 117C and 117D) between each of the four points of contact between the weigh platter 22D and the cantilever-type weigh scale arms 22A and 22B, and then connecting these piezo-electric strain-gauge devices to electrical interface circuitry 118 that converts analog electrical pressure signals into corresponding digital electrical signals that are supplied to the input ports of a programmed digital signal processing (DSP) chip 119. In turn, DSP chip 119 is interfaced with system controller 37, shown in FIG. 3.

The primary function of these piezo-electric strain-gauge devices 117A through 117D is to monitor (in real-time) pressure forces exerted on these gauges by the weigh platter 22D, over time, and generate corresponding analog electrical voltage signals which are digitized by interface circuitry 118, so that corresponding digital signals can be analyzed by the digital signal processing (DSP) chip 119, for the purpose of automatically detecting (i) non-weighing (including scanning) events, as well as normal (ii) weighing events supported on the weigh platter 22D of the POS-based checkout/scale system 1B.

These piezo-electric strain-gauges 117A through 117D and interface circuitry 118 should be calibrated for the purpose of detecting such weighing and non-weighing (i.e. scanning) events across the weigh platter of the POS-based checkout/scale system 1B, but not necessarily for accurately detecting the true weight of produce and other items being weighed on the weigh platter for purchase purposes. Preferably, the calibration process will also set the upper weight limits that the weigh scale subsystem 22 is capable of weighing, and that the strain-gauges are able to detect when such conditions are exceeded, causing the weigh platter to be automatically lifted by the powered lifting mechanism 100' installed in the system 1B. Routine experimentation will be required to calibrate the piezo-electric strain-gauge devices 117A through 117D for the purposes of the automatic weigh function detection subsystem 116. The DSP 119 can be programmed in a straightforward manner to automatically detect: (i) non-weighing (including scanning) events supported on the weigh platter 22D of the POS-based checkout/scale system when only transient-type pressure signals are generated from the piezo-electric strain-gauge devices 117A through 117D, indicating non-weighing and code symbol reading events being performed at the POS-based checkout/scale system; and (ii) normal weighing events supported on the weigh platter 22D of the POS-based checkout/scale system when only non-transient (i.e. steady-state) pressure signals are generated from the piezo-electric strain-gauge devices 117A through 117D, indicating weighing events being performed at the POS-based checkout/scale system.

The above mechanisms can be implemented as discrete systems, such as four independent motors (e.g. linear motors), or as part of an integrated drive train. For instance one actuator could drive a rack gear that drives two pinions associated with cams to lift the platter or support the scale arm. In such a scenario only two drive mechanisms would be needed instead of four independent systems.

Notably, when supporting the scale cantilever arms using either support mechanism shown in FIGS. 4A through 4C and 5A through 5C, particular care must be taken not to exert a force on the arm that would distort or damage the load cell module 22C. To minimize the chances of this occurring, force feedback could be used to minimize the forces exerted on the cantilever-type weigh scale arms 22A, 22B.

Figure 6:
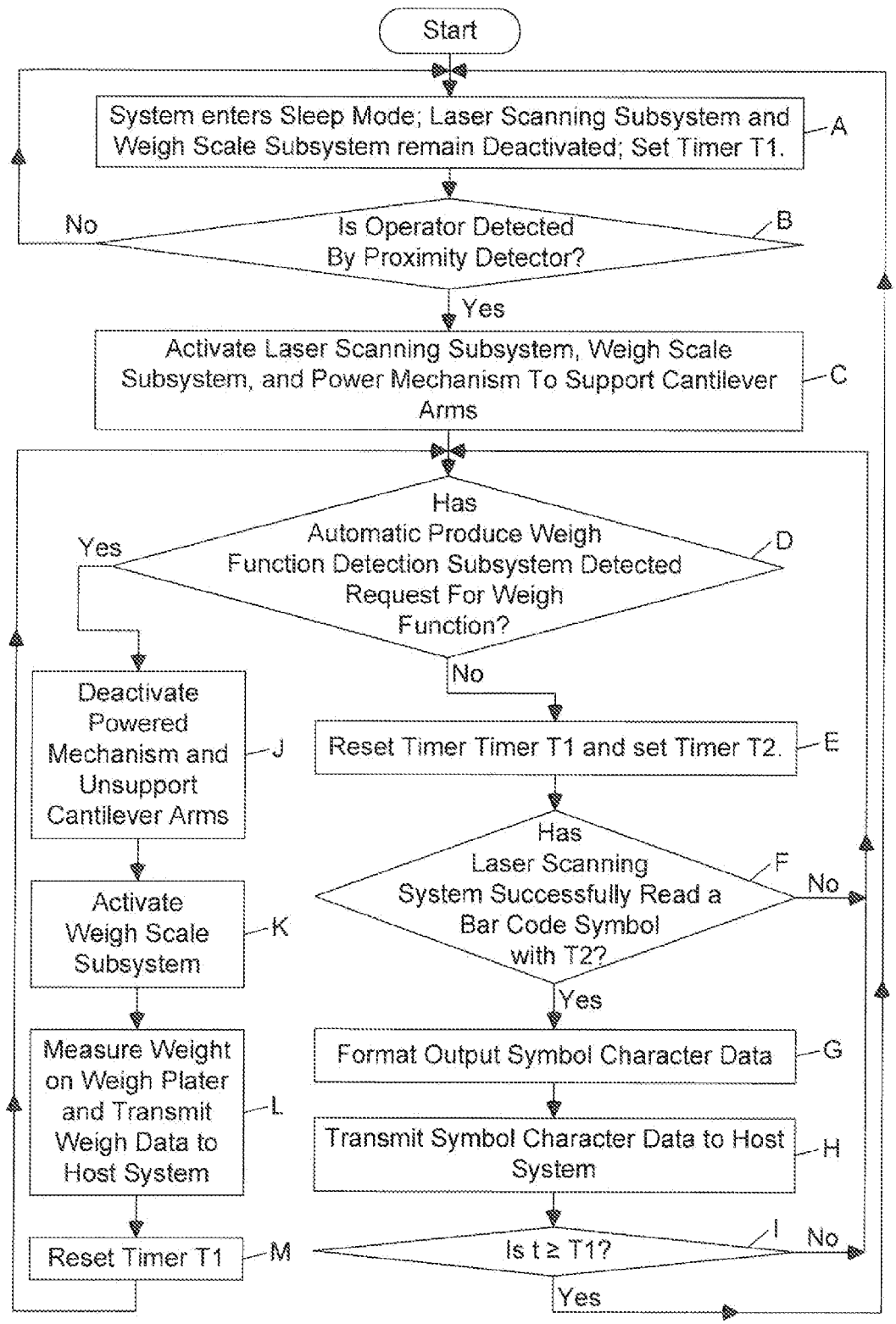
FIG. 6 is a flow chart describing the operation of the POS-based checkout/scale system embodiments shown in FIGS. 3 through 5C.

The Operation of the First Generalized POS-Based Checkout/Scale System Embodiments FIG. 6 describes the operation of the POS-based checkout/scale system embodiments 1A and 1B shown in FIGS. 3 through 5C.

As indicated at Block A in FIG. 6, the system enters the sleep mode, the laser scanning subsystem and weigh scale subsystem remain deactivated, and timer T1 is set. Preferably, during this sleep mode, the powered cantilever-arm support mechanism 100 is engaged so as to support the cantilever-type weigh scale arms 22A, 22B.

At Block B, the system determines whether or not the operator is detected by the proximity detector 75, and if not, then the system returns to Block A and remains in this loop until the operator is detected by the proximity detector 75. In the event the proximity detector 75 detects the operator, then the system proceeds to Block C and activates the laser scanning bar code symbol reading subsystem 150 and the weigh scale subsystem 22 for operation.

At Block D, the system determines whether or not the automatic weigh function subsystem 116 has detected a request for weigh function.

At Block E, the system controller resets the timer T1 and sets timer T2.

At Block F, the system controller determines whether or not the laser scanning subsystem 150 reads a bar code symbol within time period T2. In the event that a bar code symbol is not read within time period T2 at Block F, then the system controller 37 returns to Block D. In the event that a bar code symbol is read at Block F, then the system proceeds to Block G, formats the output symbol character data, and then at Block H, the symbol character data is transmitted to the host system.

At Block I, the system controller determines whether or not timer T1 has lapsed, and if not, then the system returns to Block D, as indicated in FIG. 6. If at Block I, timer T1 has lapsed, then the system controller returns to Block A.

If at Block D, the automatic weigh function detection subsystem 116 detects a request for weigh function, then at Block J, the system controller deactivates the powered mechanism so as to un-support the cantilever-type weigh scale arms, and allow the load cell to experience the full weight of the weigh platter and any objects positioned thereon.

At Block K, the system controller activates the weigh scale subsystem, and then at Block L, measures the weight of objects on the weigh platter, and transmits the weigh data to the host system.

At Block M, the system controller resets time T1 and then returns to Block D.

Second Generalized Embodiment of the Bi-Optical POS-Based Checkout/Scale System

FIGS. 7A through 7C shows a perspective view of a second generalized embodiment of a bi-optical POS-based checkout/scale system 1' of the present disclosure. As shown, system 1' is equipped with an integrated electronic weigh scale subsystem 22 having an electronically-controlled weigh platter support mechanism 200 which is programmed to rapidly support the weigh platter 22D until an item about to be placed on the weigh platter surface 22D is automatically detected by an automatic weigh function detection subsystem 216.

FIGS. 7A through 7C show the second generalized embodiment of the bi-optical POS-based checkout/scale system 1'. As shown, the POS-based system 1' is equipped with an integrated electronic weigh scale subsystem 22 having an electronically-controlled weigh platter support mechanism 200 and a cantilever arm support subsystem 22A and 22B operably connected to an electronic load cell module 22C, and supporting the weight of weigh platter 22D; an electronically-controlled weigh platter support subsystem 200 is programmed to rapidly support the weigh platter 22D until one or more items placed on the weigh platter 22D are automatically detected by an automatic weigh function detection subsystem 216 automatically allowing the cantilever weigh arms 22A and 22B to bear the full weight of the weigh platter 22D and any items supported thereon, and the load cell module 22C of the weigh subsystem 22 to accurately measure the weight of items on the weigh platter 22D, and transmit this measured weight to the host system 9 during checkout operations.

Referring to FIGS. 8A through 8C, the electronic weigh scale subsystem 22 is shown detached from the POS-based checkout/scale system 22 of FIG. 7A, and its load cell module 22C and pair of cantilever arms 22A and 22B extending from the load cell module 22C and adapted to support the weigh platter 22D for purposes of illustration. An exemplary electronic weigh scale subsystem 22 employing cantilever-type weigh arms, suitable for use with bar code scanning systems as shown in FIGS. 7A through 7C, is commercially available from Mettler-Toledo, GmbH. However, it is expected that other types of electronic weigh scale systems can be used with good performance results.

As shown in FIGS. 7A, 7B and 7C, the POS-based checkout/scale system of the second illustrative embodiment 1' includes a system housing 2 having a vertical housing section 2A having a vertical optically transparent (glass) scanning window 3A, and a horizontal housing section 2B having a horizontal optically transparent (glass) scanning window 3B. Typically, the system is installed at a retail point of sale (POS)

checkout station, well known in the art. The retail POS station will have a countertop surface, and oftentimes a conveyor belt for moving products towards the bar code symbol reading system. Also provided is a host computer system 9, that is connected to the retail LAN and/or WAN on which one or more product price database systems (RDBMS), will be deployed.

As shown, the horizontal and vertical sections 2A and 2B of the system housing are arranged in an orthogonal relationship with respect to each other such that the horizontal vertical scanning windows are substantially perpendicular.

Figure 9:
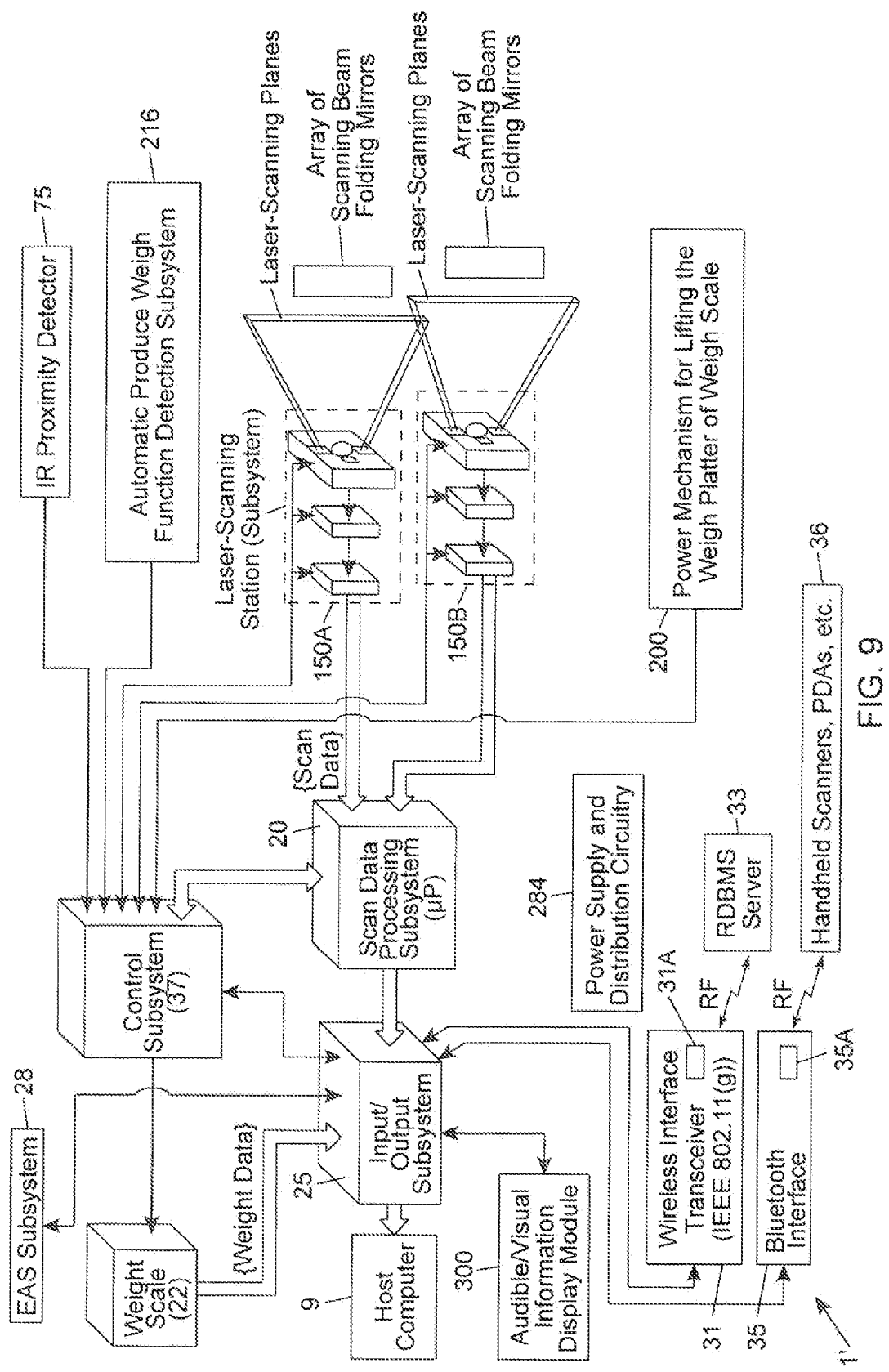
FIG. 9 is a schematic diagram showing the system subcomponents of the second generalized embodiment of the POS-based checkout/scale system of FIG. 7A, equipped with its integrated electronic weigh scale subsystem having an automatic weigh function detection subsystem and an electronically-controlled powered mechanism for lifting the weigh platter of the weigh scale subsystem.
Figures 9A, 9B:
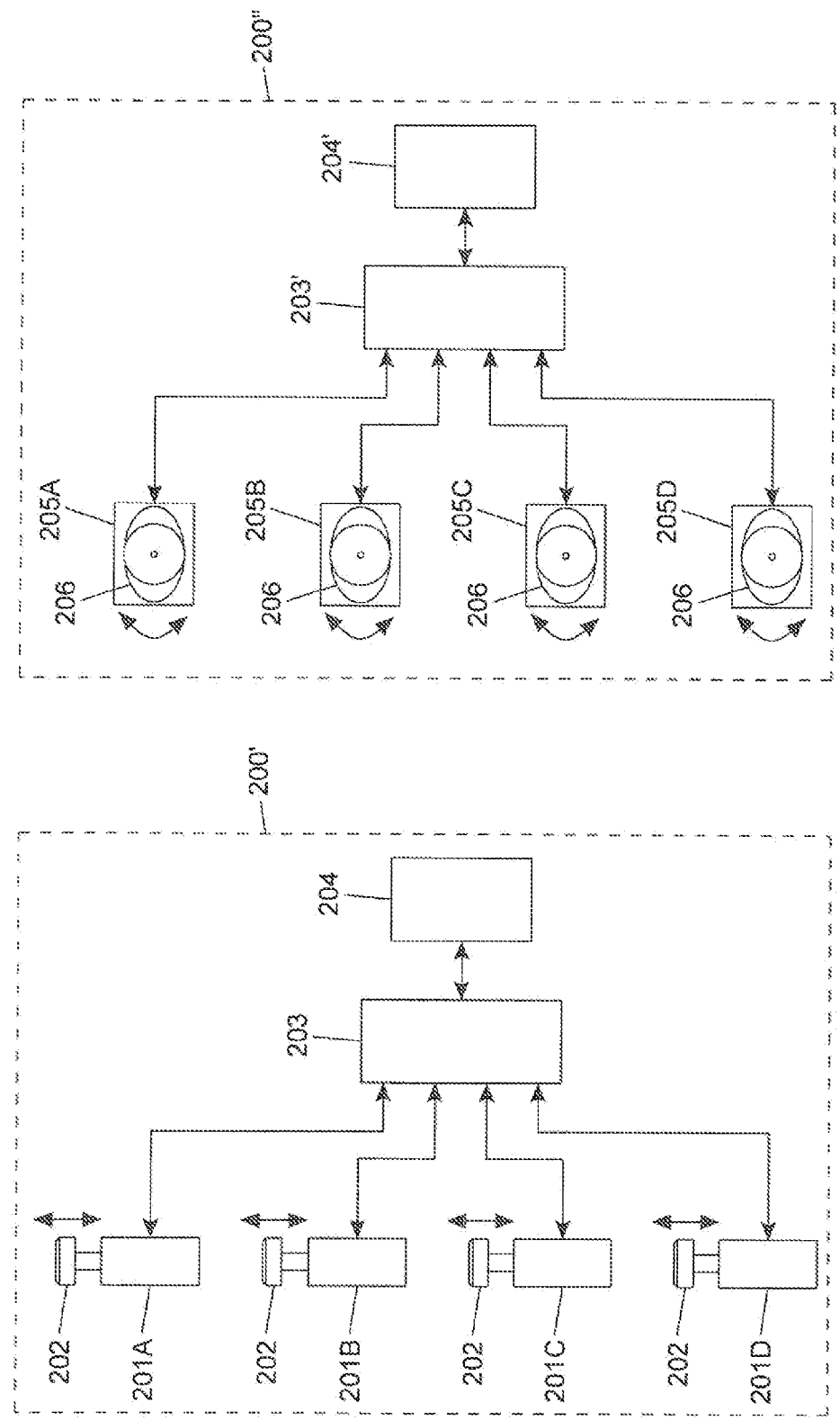
FIG. 9A is a schematic representation of a first illustrative embodiment of the power mechanism for lifting the cantilever arms if the weigh scale subsystem, using linear motor driven devices, depicted in the system diagram of FIG. 9.
FIG. 9B is a schematic representation of a second illustrative embodiment of the power mechanism for lifting the cantilever arms of the weigh scale subsystem, using rotary driven devices, depicted in the system diagram of FIG. 9.

As shown in FIG. 9, a laser scanning subsystem 150, supporting first and second laser scanning stations 150A and 150B, is mounted within the system housing, and generates and projects a complex groups of laser scanning planes through laser scanning windows 3A and 3B. These laser scanning planes intersect and produce an omni-directional laser scanning pattern within a 3D scanning volume 500 defined between the vertical and horizontal scanning windows 3A and 3B, as shown in FIGS. 7 and 7C.

As shown FIG. 7A, the 3D scanning volume is bounded by the vertical scanning window 3A and the edges of the horizontal scanning window 3B. In the illustrative embodiment, each laser scanning station 150A, 150B is constructed from a rotating polygon, a laser diode source, light collection optics, a photodiode, and other optical components arranged as disclosed in U.S. Pat. No. 7,422,156, incorporated herein by reference, as if set forth fully herein.

As shown in FIG. 7A, an IR-based proximity detector 75 is mounted in the front portion of the housing for automatically detecting the presence of a human operator in front of the 3D scanning volume during system operation. The function of the IR-based proximity detector 75 is to wake up the system (i.e. WAKE UP MODE), and cause a SLEEP Timer (T1) to be set to count how long the system has to read a bar code symbol (e.g. 15 minutes) before the system is automatically induced into its SLEEP MODE, where the polygon scanning element and laser diodes are deactivated to conserve electrical within the system. Preferably, the IR-based proximity (i.e. wake-up) detector 75 is realized using (i) an IR photo-transmitter for generating a high-frequency amplitude modulated IR beam, and (ii) a IR photo-receiver for receiving reflections of the amplitude modulated IR beam, using a synchronous detection circuitry, well known in the art.

As shown in FIG. 9, POS-based checkout/scale system 1' comprises system subcomponents including: a bar code symbol reading subsystem 150 including laser scanning stations 150A and 150B for generating and projecting groups of laser scanning planes through the vertical and horizontal scanning windows 3A and 3B, respectively, and generating scan data streams from scanning objects in the 3D scanning volume 500; a scan data processing subsystem (i.e. scan data processor) 20 for supporting automatic scan data processing based bar code symbol reading using scan data streams generated from stations 150A and 150B; an integrated electronic weigh scale subsystem 22; automatic weigh function detection subsystem 216 for automatically detecting that one or more items have been placed on the weigh platter 22D for weighing, and generating control signals upon the automatic detection of such weigh platter loading events, for use by the system controller 37; electronically-controlled powered mechanism 200 for lifting the weigh platter 22D so that that the load cell module 22C is not loaded during non-weighing operations (i.e. bar code symbol scanning and checkout operations) supported at the POS-based checkout/scale system 22; a Blue-Tooth® RF 2-way communication interface 35 including RF transceivers and antennas for connecting to Blue-tooth® enabled hand-held scanners, imagers, PDAs, portable computers 36 and the like, for control, management, application and diagnostic purposes; IR-based wake-up detector 75, operably connected to the control subsystem (i.e. system controller) 37 for generating and supplying a trigger signal to the system controller in response to automatic detection of an operator in proximity (e.g. 1-2 feet) of the system housing; Electronic Article Surveillance (EAS) Subsystem 28 (including a Sensormatic® EAS tag deactivation block 29 integrated in system; an audible/visual information display subsystem (i.e. module) 300; an input/output subsystem 25 for interfacing with the image processing subsystem 20, the electronic weigh scale subsystem 22, Electronic Article Surveillance (EAS) Subsystem 28 and audible/visual information display module 300, and supporting universal, standard and/or proprietary data communication interfaces with host system 9 and other external devices.

Figure 10A:
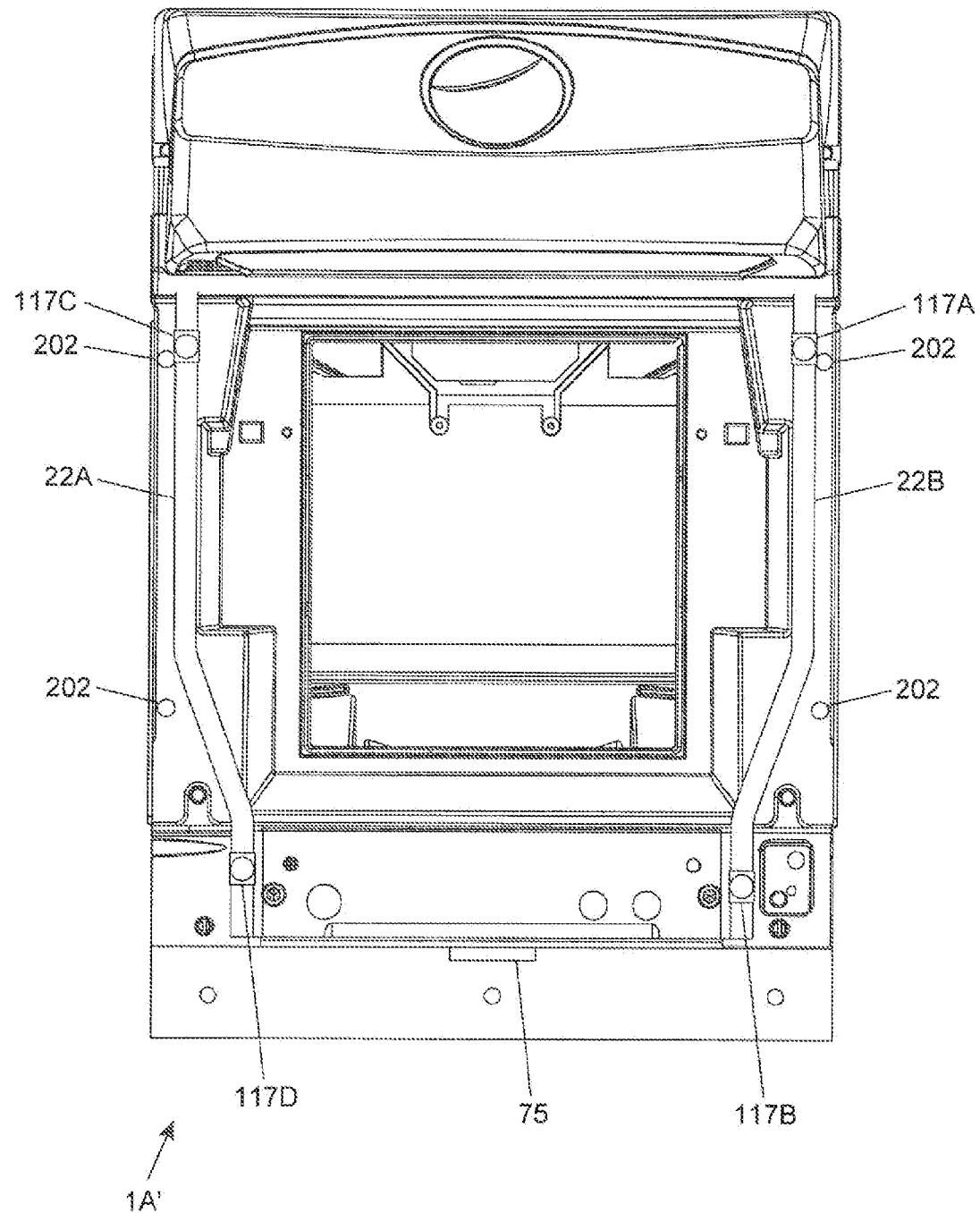
FIG. 10A is a plan view of a first illustrative embodiment of the second generalized embodiment of the POS-based checkout/scale system, showing its weigh platter removed from and revealing the cantilever arms of the integrated electronic weigh scale subsystem, and the location of the pistons that support the weigh platter until its automatic weigh function detection subsystem detects an object of sufficient weight on the weigh platter for a predetermined time period, and then automatically retracts support of the weigh platter and allows normal weight measurement on the weigh platter.
Figure 10C:
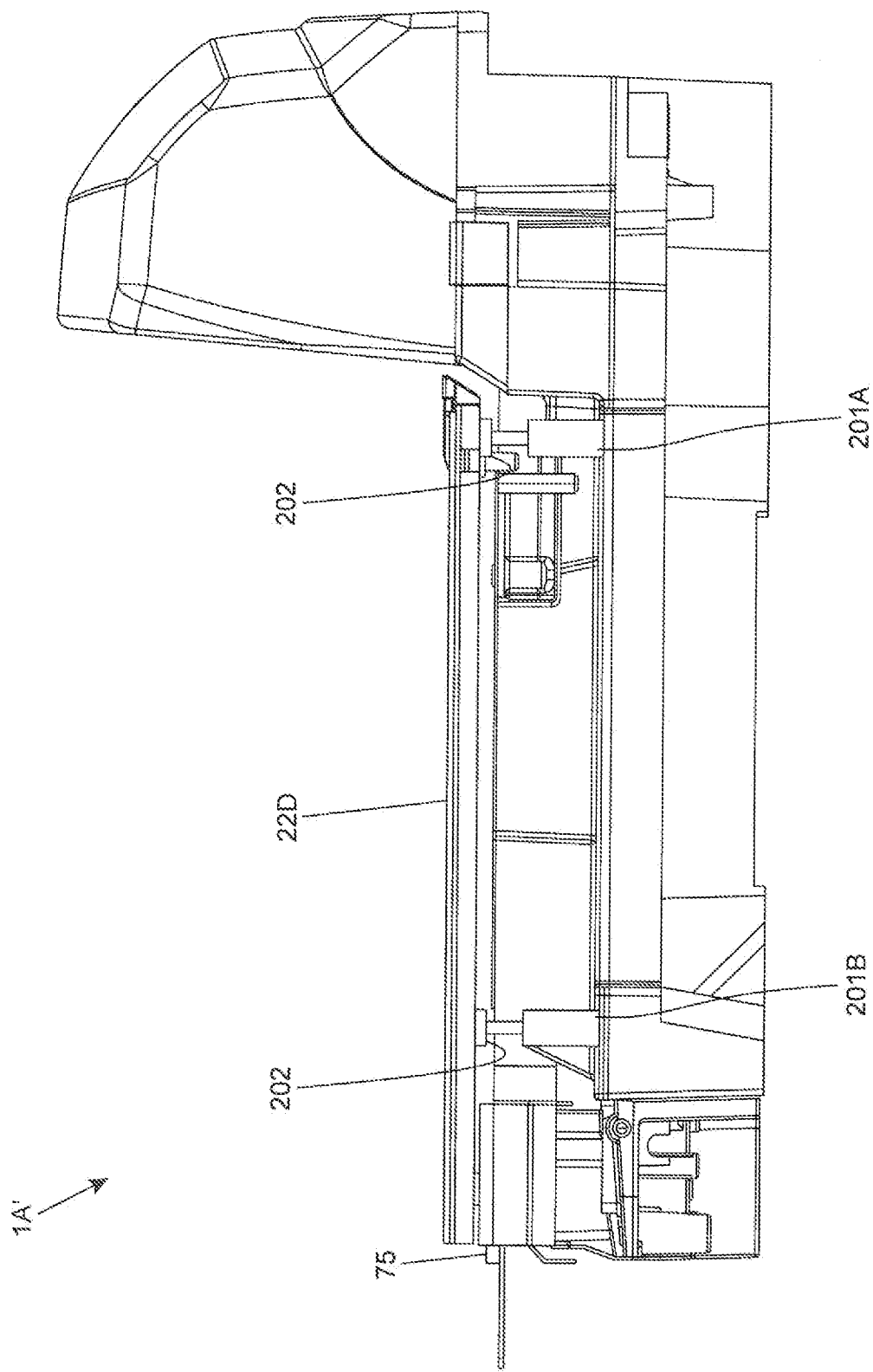
FIG. 10C is an elevated side view of the POS-based checkout/scale system of FIGS. 7A, 9 and 10A showing its cantilever arms removed and revealing the weigh platter of the integrated electronic weigh scale subsystem, supported by the electronically-controlled piston-based powered mechanism for lifting the weigh platter of the weigh scale subsystem and allowing the weigh platter to bear the full weight of objects supported thereon during produce weighing operations.

First Illustrative Embodiment of the Second Generalized Embodiment of the POS-Based Checkout/Scale System FIGS. 10A through 10C depict a first illustrative embodiment 1A' of the second generalized embodiment of the POS-based checkout/scale system shown in FIGS. 1A and 3, wherein its weigh platter is removed revealing the cantilever-type weigh scale arms 22A and 22B of the electronic weigh scale subsystem 22. As shown, the weigh platter 22D is physically supported by an electronically-controlled piston-based powered mechanism 200' until the automatic weigh function detection subsystem 216 automatically detects the presence of an object of sufficient weight on the weigh platter 22D for a predetermined time period, and then automatically retracts support of the weigh platter 22D and allows normal weight measurement on the weigh platter using the cantilever-type weigh scale arms 22A through 22B.

In general, there are various ways in which the weigh platter 22D can be lifted, or supported, to effectively minimize the forces exerted on the load cell module 22C during non-weighing operations supported on the POS-based checkout/scale system 1A'.

For example, as shown in FIGS. 10A, 10B and 10C, the weigh platter 22D is supported by four linear-actuated pistons 201 through 201D, each of which has a lifter 202 which is located beneath one end of one of the cantilever support arms 22A and 22B, as shown. Using this four point support method, weight bearing forces generated by the weigh platter 22D and objects placed thereon can be effectively counteracted along the cantilever-type weigh scale arms 22A and 22B and not experienced by the electronic load measuring cell 22C. However, if only one piston-type support mechanism is to be used per cantilever-type scale weigh arm, then preferably the piston-based support mechanism 200' should be placed at the end of the arm opposite the load cell module 22C. When supporting the cantilever-type scale arms using piston-type support mechanisms, particular care must be taken not exert a force on the arm that would distort or damage the electronic load cell 22C. To minimize the chances of this occurring, force feedback can be used to minimize the forces exerted on the arms.

The above piston-based mechanisms can be implemented as four discrete systems, such as four independent linear actuators or (linear stepper) motors, or as part of an integrated drive train. Alternatively, one linear actuator could drive a rack gear which drives two pinions associated with cams that lift and support the cantilever-type scale arms. In such a scenario, only two drive mechanisms would be needed instead of four independent systems.

As shown in the illustrative embodiment shown in FIGS. 10A through 10C, each piston-based lifting mechanism 201A through 201D is realized as linear-actuated motor or linear stepper motor. Each piston-based lifting mechanism 201A through 201D receives drive signals from interface circuitry 203 and is controlled by programmed microcontroller 204. As each linear stepper motor incrementally and synchronously advances along its linear axis, causing its respective lifter 202 to exert a force upon and lifts the weigh platter 22D at its four points of support, and thus the weigh of objects (e.g. produce items) supported thereupon. Typically, during a complete lifting and lowering cycle, the lifter 202 starts out as shown in FIG. 10B, with the piston (i.e. linear stepper motor) lifting the weigh platter 22D, to a non-weighing position. Then after moving the lifters down as shown in FIG. 10C, the weigh platter is not supported and is configured in a normal weighing position, allowing all weight of the weigh platter and any objects thereupon (within the limit of the scale subsystem) to bear upon and be transmitted through the cantilever-type weigh scale arms 22A through 22D to the electronic cell 22C operably connected thereto.

The above weigh platter lifting process is performed each time the automatic weigh function detection subsystem 216 detects a non-weighing event on the weigh platter (i.e. no items detected on the weigh platter), and the weigh platter lowering process is performed by the powered mechanism 200' each time the automatic weigh function detection subsystem 216 detects a weighing event on the platter (i.e. items detected on the weigh platter).

Preferably, the automatic weigh function detection subsystem 216 is realized by installing a piezo-electric strain-gauge device 117A through 117D between each of the four points of contact between the weigh platter 22D and the weigh platter support mechanism 200', and connecting these piezo-electric strain-gauge devices to the input ports of a digital signal processing (DSP) chip 119' by way of electrical interface circuitry 118'. The function of the electrical interface circuitry is to convert the analog electrical signals produced from the pressure sensors into corresponding digital electrical signals that are supplied as input to the DSP chip 119'. As shown in FIG. 9, the DSP chip is interfaced with the system controller 37 and receives control signals generated by the DSP chip during system operation.

The primary function of these piezo-electric strain-gauge devices 117A through 117D is to monitor (in real-time) pressure forces exerted on these gauges by the weigh platter 22D, over time, and generate corresponding analog electrical voltage signals which are digitized by interface circuitry 118', so that corresponding digital signals can be analyzed by the digital signal processing (DSP) chip 119', for the purpose of automatically detecting (i) non-weighing (including scanning) events, as well as normal (ii) weighing events supported on the weigh platter 22D of the POS-based checkout/scale system 1A'.

These piezo-electric strain-gauges 117A through 117D and interface circuitry 118' should be calibrated for the purpose of detecting such weighing and non-weighing (i.e. scanning) events across the weigh platter of the POS-based checkout/scale system 1A', but not necessarily for accurately detecting the true weight of produce and other items being weighed on the weigh platter 22D for purchase purposes. Preferably, the calibration process will also set the upper weight limits that the weigh scale subsystem is capable of weighing, and that the strain-gauges are able to detect when such conditions are exceeded, causing the weigh platter to be automatically lifted by the powered lifting mechanism 200' installed in the system 1A'. Routine experimentation will be required to calibrate the piezo-electric strain-gauge devices 117A through 117D for the purposes of the automatic weigh function detection subsystem 216. The DSP 219' can be programmed in a straightforward manner to automatically detect: (i) non-weighing (including scanning) events supported on the weigh platter 22D of the POS-based checkout/scale system when only transient-type pressure signals are generated from the piezo-electric strain-gauge devices 117A through 117D, indicating non-weighing and code symbol reading events being performed at the POS-based checkout/scale system 1A'; and (ii) normal weighing events supported on the weigh platter 22D of the POS-based checkout/scale system when only non-transient (i.e. steady-state) pressure signals are generated from the piezo-electric strain-gauge devices 117A through 117D, indicating weighing events being performed at the POS-based checkout/scale system 1A'.

The above mechanisms can be implemented as discrete systems, such as four independent linear actuators, or as part of an integrated drive train. For instance one actuator could drive a rack gear that drives two pinions associated with cams to lift the platter or support the scale arm. In such a scenario only two drive mechanisms would be needed instead of four independent systems.

Figure 11A:
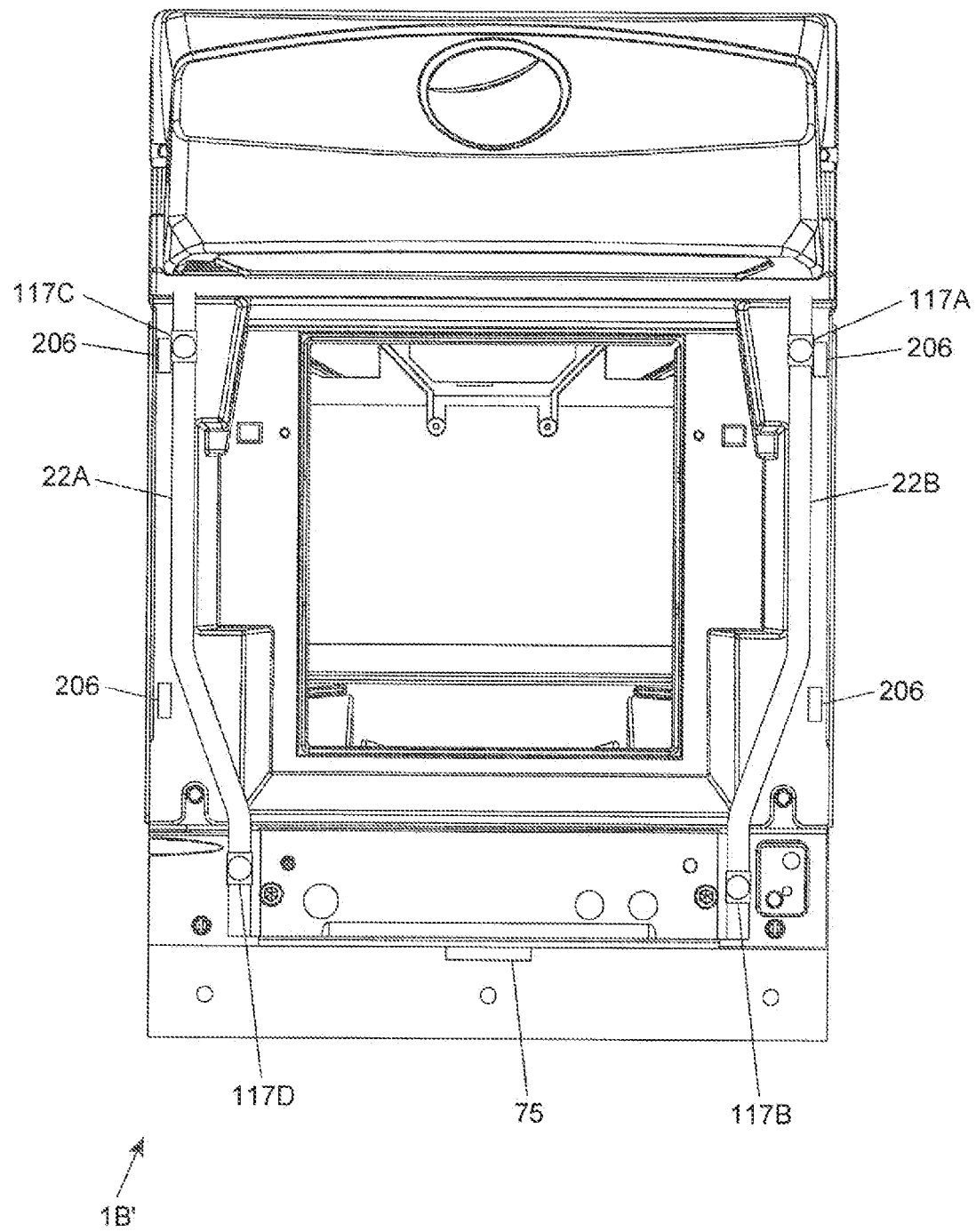
FIG. 11A is plan view of a second illustrative embodiment of the second generalized embodiment of the POS-based checkout/scale system, showing its produce weigh platter from removed and revealing the cantilever arms of the integrated electronic weigh scale subsystem, and the location of the rotatable cams that support the weigh platter until its automatic weigh function detection subsystem detects an object of sufficient weight on the weigh platter for a predetermined time period, and then automatically retract support of the weigh platter and allow normal weight measurement on the weigh platter.
Figure 11B:
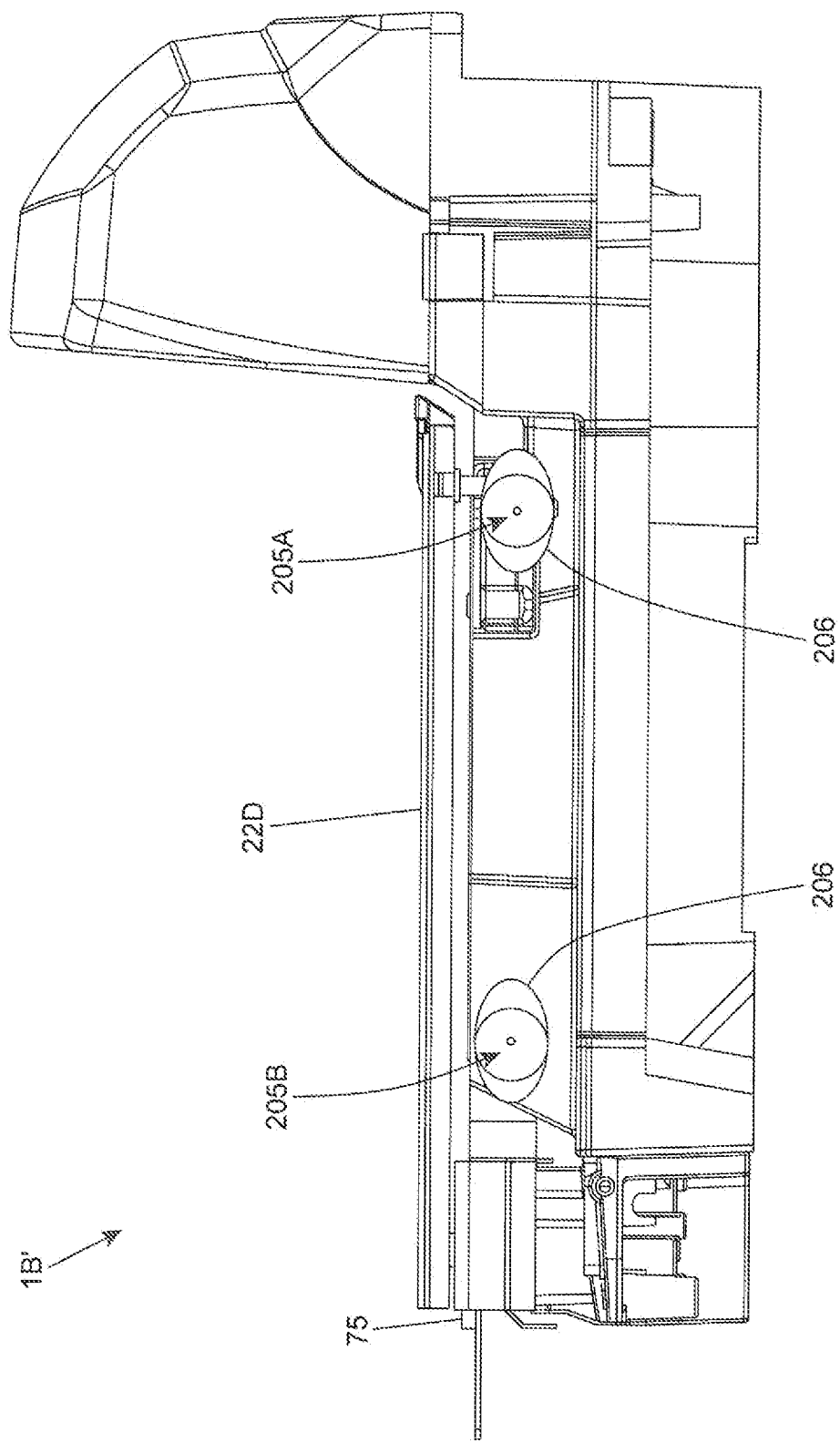
FIG. 11B is an elevated side view of the POS-based checkout/scale system of FIGS. 1A, 3 and 11A, showing its scale cantilever arms removed and revealing the cam-based powered mechanism for supporting the weigh platter of the integrated electronic weigh scale subsystem in a non-supporting orientation.

Second Illustrative Embodiment of the Second Generalized Embodiment Bi-Optical POS-Based Checkout/Scale System FIGS. 11A through 11C show a second illustrative embodiment 1B' of the first generalized embodiment of the POS-based checkout/scale system of FIGS. 7A through 9, wherein its produce weigh platter 22D is removed revealing the cantilever arms of the integrated electronic weigh scale subsystem 22.

As shown, the weigh platter 22D is physically supported by an electronically-controlled cam-based powered mechanism 200" until its automatic weigh function detection subsystem 216 detects an object of sufficient weight on the weigh platter 22D for a predetermined time period, and then automatically retracts support of the weigh platter 22D and allows normal weight measurement on the weigh platter 22D.

In general, there are various ways in which the weigh platter 22D can be lifted, and minimizing weigh platter generated forces exerted on the load cell module 22C, during non-weighing operations supported on the POS-based checkout/scale system 1B'.

For example, as shown in FIGS. 11A, 11B and 11C, the weigh platter 22D is supported by rotatable cam-based lifting mechanisms 205A through 205D using either a four point support method, wherein one cam-type mechanism is located beneath each end of the cantilever support arms, as shown. Each cam-based lifting mechanism 205A through 205D receives drive signals from interface circuitry 203' and is controlled by programmed microcontroller 204'. As shown, each cam-based lifting mechanism 205 is realized as an oval disc 206, other suitable cam shapes are possible, mounted on the shaft of an electronically-controlled stepper motor, designed to rotate, in a synchronous manner under the control of the programmed microcontroller 204' used to implement powered mechanism 200" employed in system 1B'. As each shaft rotates, so does each oval disc 102 exerting even lifting forces upon the weigh platter 22D, and when the stepper motor shaft reaches a predetermined angular rotation, the major axis of the oval disc will be substantially normal to the weigh platter surface 22D, and the motors will stop rotating under the control of the microcontroller 204'. Typically, during a complete lifting and lowering cycle, the oval disc 206 starts out as shown in FIG. 11B, requiring 90 degrees clockwise rotation to lift the weigh platter 22D, as shown in FIG.

11C, to its non-weighing position. Then after being rotated by another 90 degrees of rotation, the weigh platter 22D is lowered back down to a normal weighing position. Then when rotating the oval disc 206 another 90 degrees clockwise, the weigh platter is lifted once again into its non-weighing position. Then, upon another 90 degree rotation of the stepper motor shaft, the weigh platter 22D will be lowered to its non-weighing position.

The above weigh platter lifting process is performed each time the automatic weigh function detection subsystem 216 detects a non-weighing event on the weigh platter 22D (i.e. no items detected on the weigh platter), and the weigh platter lowering process is performed by the powered mechanism 200″ each time the automatic weigh function detection subsystem 216 detects a weighing event on the platter (i.e. items detected on the weigh platter).

Figure 9C:
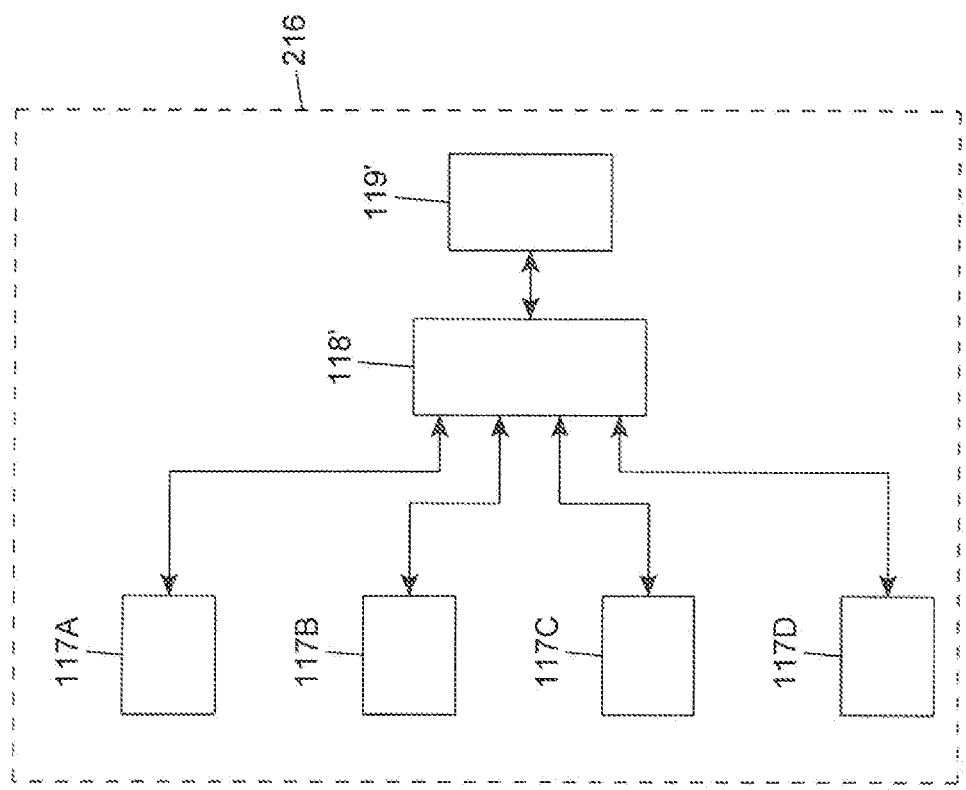
FIG. 9C is a schematic representation of an illustrative embodiment of the automatic produce weigh function detection subsystem, depicted in the system diagram of FIG. 9.

Preferably, as shown in FIG. 9C, the automatic weigh function detection subsystem 216 is realized by installing a piezo-electric strain-gauge device 106 between each of the four points of contact between the weigh platter 22D and the weigh platter support mechanism 200′ or by mounting each of the cam-type mechanisms 205A-205D on a piezo-electric strain gauge, and connecting these piezo-electric strain-gauge devices 117A through 117D to the input ports of a DSP chip 119′ via electrical interface circuitry 118′. As shown in FIG. 9, the DSP chip 119′ is interfaced with the system controller 37.

The function of these piezo-electric strain-gauge devices 117A through 117D is to continuously monitor the pressure forces exerted on these gauges by the weigh platter 22D, over time, during (i) typical non-weighing (including scanning) events, as well as during (ii) normal weighing events occurring at the POS-based checkout/scale system. The analog electrical voltage signals produced by these gauges are converted into digital voltage signals, and then analyzed by the DSP chip 119 so as to automatically detect the above weigh platter conditions, and the transmit corresponding control signals to the system controller 37.

These piezo-electric pressure gauges should be calibrated for the purpose of detecting such weighing and non-weighing (i.e. scanning) events at the weigh platter of the POS-based checkout/scale system, but not intended for accurately detecting the true weight of produce and other items being weighed on the weigh platter 22D for POS purposes. Preferably, the calibration process will also determine the upper weight limits of the weigh scale subsystem so that the strain-gauges are able to detect when such conditions are exceeded, causing the weigh platter to be automatically lifted by the lifting mechanism installed in the system. Routine experimentation will be required to calibrate the piezo-electric strain-gauge devices for the purposes of the automatic weigh function detection subsystem 216

The above mechanisms can be implemented as discrete systems, such as four independent cam-type mechanisms, or as part of an integrated drive train. For instance one motor could drive a rack gear that drives two pinions associated with cams to lift the platter. In such a scenario only two drive mechanisms would be needed instead of four independent systems.

Notably, when supporting the weigh platter 22D using either support mechanism shown in FIGS. 10A through 10C and 11A through 11C, particular care must be taken not to exert forces on the cantilever-type weigh scale arms 22A and 22B that would distort or damage the electronic load cell 22C. To minimize the chances of this occurring, force feedback can be used to minimize the forces exerted on the cantilever-type weigh scale arms.

The Operation of Second Generalized POS-Based Checkout/Scale System Embodiments

Figure 12:
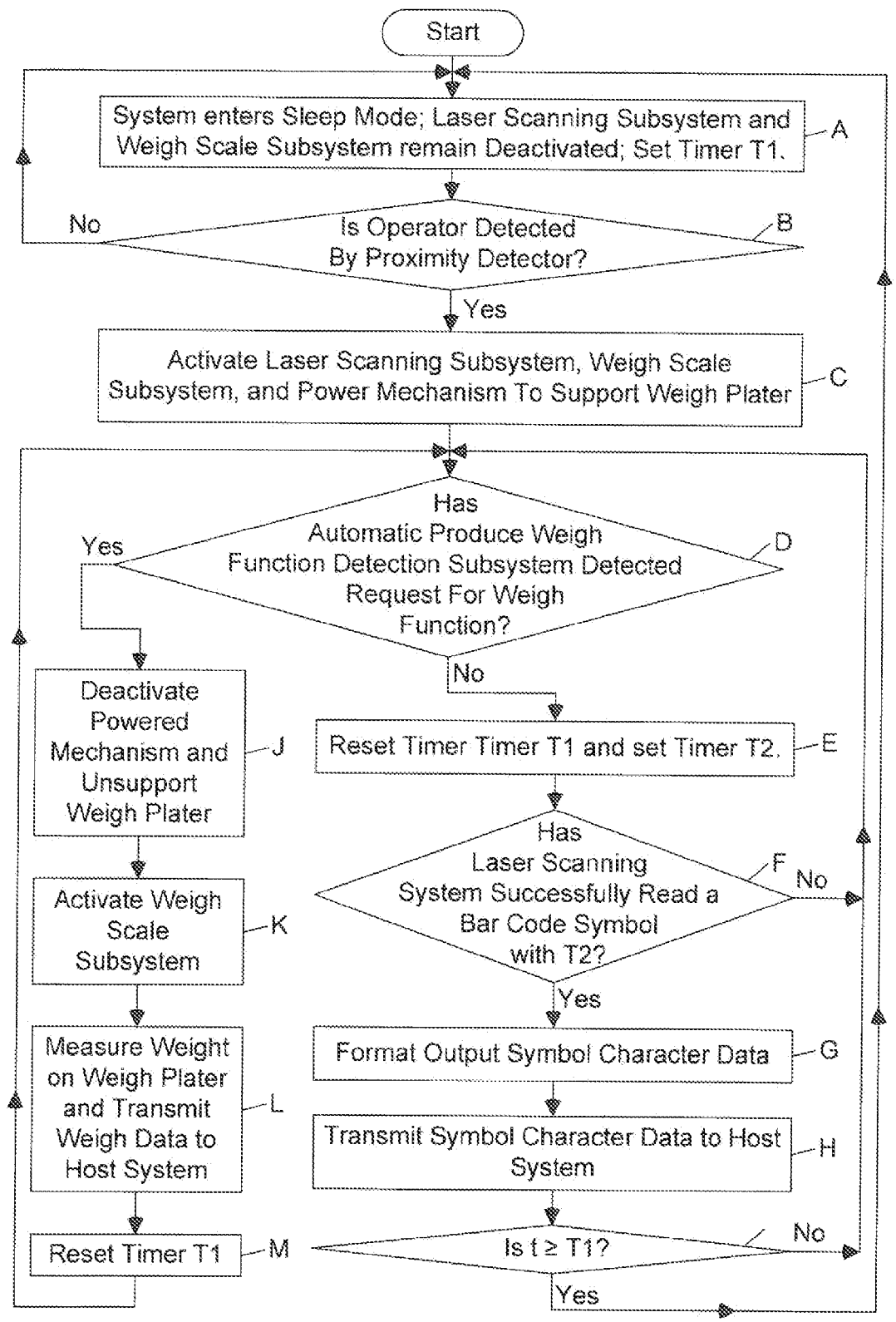
FIG. 12 is a flow chart describing the operation of the POS-based checkout/scale system embodiments shown in FIGS. 7A through 11C.

FIG. 12 is a flow chart describing the operation of the POS-based checkout/scale system embodiments 1A′ and 1B′ shown in FIGS. 7A through 11C.

As indicated at Block A in FIG. 12, the system enters the sleep mode, the laser scanning subsystem and weigh scale subsystem 22 remain deactivated, and timer T1 is set. Preferably, during the sleep mode, the support mechanism 200″ is engaged to support the weigh platter 22D.

At Block B, the system determines whether or not the operator is detected by the proximity detector, and if not, then the system returns to Block A and remains in this loop until the operator is detected by the proximity detector 75. In the event the proximity detector detects the operator, then the system proceeds to Block C and activates the laser scanning subsystem and the weigh scale subsystem 22 for operation.

At Block D, the system determines whether or not the automatic weigh function subsystem 216 has detected a request for weigh function.

At Block E, the system controller resets the timer T1 and sets timer T2.

At Block F, the system controller 37 determines whether or not the laser scanning subsystem reads a bar code symbol within time period T2. In the event that a bar code symbol is not read within time period T2 at Block F, then the system controller returns to Block D. In the event that a bar code symbol is read at Block F, then the system proceeds to Block G, formats the output symbol character data, and then at Block H, the symbol character data is transmitted to the host system 9.

At Block I, the system controller determines whether or not timer T1 has lapsed, and if not, then the system returns to Block D, as indicated in FIG. 12. If at Block I, timer T1 has lapsed, then the system controller 37 returns to Block A.

If at Block D, the automatic weigh function detection subsystem 216 detects a request for weigh function, then at Block J, the system controller deactivates the powered mechanism so as to un-support the weigh platter, and allow the load cell to experience the full weight of the weigh platter 22D and any objects positioned thereon.

At Block K, the system controller activates the weigh scale subsystem, and then at Block L, measures the weight of objects on the weigh platter, and transmits the weigh data to the host system.

At Block M, the system controller resets time T1 and then returns to Block D.

If the weigh platter support scheme is implemented during operational use, as opposed to during a power save or powered off state, a manual activation or automatic sensing means can be used to lower the weigh platter and allow an item to be weighed. Automatic sensing means could include a force feedback loop in the support mechanism to indicate that the item is stationary on the weigh platter, a position sensor to indicate that the item is stationary on the weigh platter. Other mechanisms are also possible.

Modifications that Come to Mind

In embodiments where the weigh arm or platter supports are incorporated into the bucket design of the POS-based system, such supports can be appropriately sealed to prevent/minimize any contamination of the optical chamber. The supports can be covered by a flexible gasket that is stretched when the mechanism is in a supporting position. Additionally, the supports can be placed on top of the bucket, thus eliminating the possibility of contaminating the optical chamber.

In this scenario the mechanism will still need to be sealed to prevent debris accumulation that could hinder the operation of the mechanism.

In embodiments where the cantilever weigh arms are supported, the system can be designed such that the supports are shielded from falling debris by the arms themselves. The support surfaces should be rounded or shaped such that debris has a difficult time accumulating on them. If a cam support is used and rotates in only one direction, then it would be possible to include a structure to "wipe" debris from the support surfaces.

While a four point support technique has been used to support the cantilever-type weigh scale arms and the weigh platter, alternatively, a four-bar mechanism, similar to a walking beam, located approximately in the middle of the platter, can be used for weight measurement.

Also, the illustrative embodiment have been described in connection with various types of code symbol reading applications involving 1-D and 2-D bar code structures (e.g. 1D bar code symbols, 2D stacked linear bar code symbols, and 2D matrix code symbols). Hereinafter, the term "code symbol" shall be deemed to include all such code symbols.

It is understood that the POS-based checkout/scale system of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope of the claims appended hereto.

What is claimed is:

1. A POS-based checkout/scale system operably connected to a host computer system comprising:
   a system housing having a vertical housing section with a vertical scanning window and a horizontal housing section with a horizontal scanning window adjacent said vertical scanning window;
   a bar code symbol reading subsystem disposed in said system housing, for projecting and collecting light through said vertical scanning window, so as to read bar code symbols on one or more objects within a scanning volume defined before said vertical scanning window, and producing symbol character data representative of each said read bar code symbol;
   an electronic weigh scale subsystem including a weigh platter supported above said horizontal housing section by a pair of cantilever weigh scale arms operably connected to an electronic load cell module configured to weigh items placed on said weigh platter during a weigh mode of operation, and generating weigh data associated with the weight of said items;
   a powered support mechanism for automatically supporting at least one of said pair of cantilever weigh scale arms and said weigh platter, so that a minimal load is experienced by said electronic load cell module during non-weighing operations including bar code symbol reading operations, supported at said POS-based checkout/scale system;
   a plurality of pressure sensing devices mounted between said weigh platter and said cantilever weigh scale arms, for generating electrical signals indicative of pressure applied to said pressure sensing devices by items placed on or dragged over said weigh platter;
   interface circuitry for receiving said electrical signals and generating digital signals corresponding to said electrical signals; and
   a programmed processor for processing said digital signals and automatically detecting: (i) non-weighing events; and (ii) weighing events supported on said weigh platter of said POS-based checkout/scale system;
   wherein during a first state of operation, said powered support mechanism automatically allows the cantilever weigh scale arms to bear the full weight of said weigh platter and any items supported thereon so that said electronic load cell module can accurately measure the weight of items on said weigh platter, and generate weigh data for transmission to said host computer system; and
   wherein during a second state of operation, said powered support mechanism automatically prevents said electronic load cell module from experiencing the weight of items placed on said weigh platter during non-weighing operations including bar code symbol reading operations.

2. The POS-based checkout/scale system of claim 1, which further comprises a weigh function detection subsystem for automatically detecting that one or more of said items have been placed on said weigh platter for weighing, and generating control signals upon said automatic detection of certain weigh platter loading events;
   wherein during said first state of operation, said produce weigh function detection subsystem automatically detects the placement of one or more items on said weigh platter surface, and in response thereto, said powered support mechanism automatically allows the cantilever weigh scale arms to bear the full weight of said weigh platter and any items supported thereon, so that said electronic load cell module can accurately measure the weight of items on said weigh platter, and generate weigh data for transmission to said host computer system; and
   wherein during said second station of operation, said weigh function detection subsystem automatically detects that one or more items have not been placed on said weigh platter, and in response thereto, said powered support mechanism automatically prevents said electronic load cell module from experiencing the weight of items placed on said weigh platter during non-weighing operations including bar code symbol reading operations.

3. The POS-based checkout/scale system of claim 1, wherein said programmed processor automatically detects: (i) said non-weighing events supported on said weigh platter when only transient pressure signals are generated from said pressure sensing devices, indicating non-weighing and code symbol reading events being performed at said POS-based checkout/scale system; and (ii) said weighing events supported on said weigh platter when only non-transient pressure signals are generated from said pressure sensing devices, indicating weighing events being performed at said POS-based checkout/scale system.

4. The POS-based checkout/scale system of claim 1, wherein said powered weigh support mechanism comprises a plurality of piston support mechanisms disposed beneath said cantilever weigh scale arms, wherein each said piston support mechanism includes a piston-based lifting mechanism receiving drive signals from interface circuitry in response to control signals supplied by a programmed microcontroller.

5. The POS-based checkout/scale system of claim 1, wherein said powered weigh support mechanism comprises a plurality of cam support mechanisms disposed beneath said cantilever weigh scale arms, wherein each said cam support mechanism includes a cam-based lifting mechanism receiving drive signals from interface circuitry in response to control signals supplied by a programmed microcontroller.

6. The POS-based checkout/scale system of claim 1, wherein said bar code symbol reading subsystem comprises a laser scanning subsystem disposed in said system housing.

7. The POS-based checkout/scale system of claim 1, wherein said laser scanning subsystem generates and projects a plurality of laser scanning planes through said vertical and horizontal scanning windows, which intersect within said 3D volume and provide a laser scanning pattern within said 3D volume, for scanning one or more objects within said 3D volume and producing scan data for decode processing; and wherein said laser scanning subsystem comprises a scan data processor for processing said scan data in effort to read a bar code symbol on each object passed through said 3D volume, and generate symbol character data representative of each said read bar code symbol.

8. The POS-based checkout/scale system of claim 6, wherein said laser scanning pattern is an omni-directional laser scanning pattern within said 3D volume.

9. The POS-based checkout/scale system of claim 1, wherein said weigh function detection subsystem comprises:
   a second plurality of pressure sensing devices mounted between said weigh platter and said powered support mechanism, for generating electrical signals indicative of pressure applied to said second pressure sensing devices by items placed on or dragged over said weigh platter;
   wherein said programmed processor processes said digital signals and automatically detects: (i) non-weighing including bar code symbol reading events; and (ii) weighing events supported on said weigh platter of said POS-based checkout/scale system.

10. The POS-based checkout/scale system of claim 2, wherein said programmed processor automatically detects: (i) said non-weighing including code symbol reading events supported on said weigh platter when only transient pressure signals are generated from said pressure sensing devices, indicating non-weighing and code symbol reading events being performed at said POS-based checkout/scale system; and (ii) said weighing events supported on said weigh platter when only non-transient pressure signals are generated from said pressure sensing devices, indicating weighing events being performed at said POS-based checkout/scale system.

11. The POS-based checkout/scale system of claim 2, wherein said powered weigh support mechanism comprises a plurality of piston support mechanisms disposed beneath said weigh platter, wherein each said piston support mechanism includes a piston-based lifting mechanism receiving drive signals from interface circuitry in response to control signals supplied by a programmed microcontroller.

12. The POS-based checkout/scale system of claim 2, wherein said powered weigh support mechanism comprises a plurality of cam support mechanisms disposed beneath said weigh platter, wherein each said cam support mechanism includes a cam-based lifting mechanism receiving drive signals from interface circuitry in response to control signals supplied by a programmed microcontroller.

13. A system, comprising:
   a weigh platter;
   a symbol reading system for reading symbols on objects in a scanning volume above the weigh platter;
   a load cell module configured for:
      weighing items on the weigh platter; and
      generating data associated with the weight of items on the weigh platter;
   a lifting mechanism supporting the weigh platter;
   a pressure sensing device between the lifting mechanism and the weigh platter for generating signals in response to pressure applied to the weigh platter; and
   a processor configured for:
      processing the signals generated by the pressure sensing device to detect non-weighing events and weighing events;
      in response to the detection of a non-weighing event, activating the lifting mechanism to engage the weigh platter and support the weight of items on the weigh platter; and
      in response to the detection of a weighing event, deactivating the lifting mechanism to allow the load cell module to weigh the items on the weigh platter.

14. The system of claim 13, wherein the lifting mechanism comprises a piston-based mechanism for exerting a force on the weigh platter.

15. The system of claim 13, wherein the lifting mechanism comprises a cam-based mechanism for exerting a force on the weigh platter.

16. The system of claim 13, comprising cantilever scale arms supporting the weigh platter, wherein the lifting mechanism supports the cantilever scale arms.

17. A system, comprising:
   a weigh platter;
   a symbol reading system for reading symbols on objects in a scanning volume above the weigh platter;
   a load cell module configured for:
      weighing items on the weigh platter; and
      generating data associated with the weight of items on the weigh platter;
   cantilever scale arms connected to the load cell module for supporting the weigh platter;
   a lifting mechanism supporting the cantilever scale arms;
   a pressure sensing device between the cantilever scale arms and the weigh platter for generating signals in response to pressure applied to the weigh platter; and
   a processor configured for:
      processing the signals generated by the pressure sensing device to detect non-weighing events and weighing events;
      in response to the detection of a non-weighing event, activating the lifting mechanism to engage the cantilever scale arms and support the weight of items on the weigh platter; and
      in response to the detection of a weighing event, deactivating the lifting mechanism to allow the load cell module to weigh the items on the weigh platter.

18. The system of claim 17, wherein the lifting mechanism comprises a piston-based mechanism for exerting a force on the weigh platter.

19. The system of claim 17, wherein the lifting mechanism comprises a cam-based mechanism for exerting a force on the weigh platter.

20. The system of claim 17, wherein the processor is configured for:
   detecting non-weighing events in response to transient signals generated by the pressure sensing device; and
   detecting weighing events in response to non-transient signals generated by the pressure sensing device.

* * * * *